United States Patent
Jin et al.

(10) Patent No.: US 12,457,385 B2
(45) Date of Patent: Oct. 28, 2025

(54) METHOD AND DISPLAY APPARATUS FOR CHANNEL LIST DISPLAY

(71) Applicant: HISENSE ELECTRONICS TECHNOLOGY (SHENZHEN) CO., LTD, Guangdong (CN)

(72) Inventors: Chenggui Jin, Guangdong (CN); Biao Zhou, Guangdong (CN)

(73) Assignee: HISENSE ELECTRONICS TECHNOLOGY (SHENZHEN) CO., LTD, Guangdong (CN)

( * ) Notice: Subject to any disclaimer, the term of this patent is extended or adjusted under 35 U.S.C. 154(b) by 0 days.

(21) Appl. No.: 18/610,719

(22) Filed: Mar. 20, 2024

(65) Prior Publication Data

US 2024/0223863 A1    Jul. 4, 2024

Related U.S. Application Data

(63) Continuation of application No. PCT/CN2022/120939, filed on Sep. 23, 2022.

(30) Foreign Application Priority Data

Sep. 23, 2021   (CN) .......................... 202111112623.4
Sep. 1, 2022   (CN) .......................... 202211067245.7

(51) Int. Cl.
*H04N 21/482*   (2011.01)

(52) U.S. Cl.
CPC .............................. *H04N 21/4821* (2013.01)

(58) Field of Classification Search
CPC ............. H04N 21/4345; H04N 21/482; H04N 21/4722; H04N 21/431; H04N 21/2362
See application file for complete search history.

(56) References Cited

U.S. PATENT DOCUMENTS 8,752,092 B2 *   6/2014   Weeks ............... H04N 21/4384
                                                     725/41
2003/0219226 A1   11/2003   Newell et al.
(Continued)

FOREIGN PATENT DOCUMENTS

CN   101557482 A   10/2009
CN   101764974 A    6/2010
(Continued)

OTHER PUBLICATIONS

International Search Report, mailed Nov. 25, 2022, from PCT/CN2022/120939, 4 pages.
(Continued)

*Primary Examiner* — Jason Salce
(74) *Attorney, Agent, or Firm* — Workman Nydegger

(57) ABSTRACT

Disclosed are a display apparatus and method. The display apparatus can include a display, a user input interface, a speaker and a remote control. The display apparatus can obtain channel information and a program preview image of a channel according to data stream received from a broadcast system, where the program preview image is used to show program information currently being played on the channel, and the broadcast system comprises ATSC 3.0 system; and in response to receiving a command for displaying a channel list, display the channel information and the program preview image of the channel in a channel list interface on the display.

14 Claims, 16 Drawing Sheets

(56) References Cited

U.S. PATENT DOCUMENTS

| | | | |
|---|---|---|---|
| 2007/0011702 A1* | 1/2007 | Vaysman | H04N 21/4828 348/E7.071 |
| 2007/0250896 A1* | 10/2007 | Parker | H04N 7/163 725/135 |
| 2008/0127253 A1* | 5/2008 | Zhang | H04N 21/4667 725/35 |
| 2008/0134239 A1* | 6/2008 | Knowles | H04N 21/4755 725/39 |
| 2009/0307731 A1 | 12/2009 | Beyabani | |
| 2010/0325668 A1 | 12/2010 | Young et al. | |
| 2015/0074728 A1* | 3/2015 | Chai | H04N 21/4312 725/61 |
| 2015/0201148 A1 | 7/2015 | Kim et al. | |
| 2015/0237390 A1* | 8/2015 | Watters | H04N 21/47 725/44 |
| 2018/0199110 A1 | 7/2018 | Cormican et al. | |
| 2019/0115009 A1* | 4/2019 | Misra | H04H 60/58 |

FOREIGN PATENT DOCUMENTS

| | | |
|---|---|---|
| CN | 105992068 A | 10/2016 |
| CN | 113301420 A | 8/2021 |
| CN | 113852870 A | 12/2021 |
| EP | 3110150 A1 | 12/2016 |
| WO | 03/026279 | 3/2003 |
| WO | 2008/075618 A1 | 6/2008 |

OTHER PUBLICATIONS

Chinese First Office Action, mailed Apr. 22, 2023, from Chinese App. No. 202111112623.4, 20 pages.

Chinese Second Office Action, mailed Jul. 27, 2023, from Chinese App. No. 202111112623.4, 19 pages.

* cited by examiner

METHOD AND DISPLAY APPARATUS FOR CHANNEL LIST DISPLAY

CROSS-REFERENCE OF RELATED APPLICATIONS

The application is a continuation application of International Application No. PCT/CN2022/120939 filed Sep. 23, 2022, which claims priorities to Chinese Patent Application No. 202111112623.4 filed on Sep. 23, 2021 and Chinese Patent Application No. 202211067245.7 filed on Sep. 1, 2022, which are hereby incorporated by reference in their entirety.

TECHNICAL FIELD

The disclosure relates to the field of display apparatuses, and particularly to a method and a display apparatus for channel list display.

BACKGROUND

Some display apparatuses (for example, TVs) are equipped with the channel list function. After a user opens a channel list, the channel number and channel name of each channel that the broadcast TV supports and is available for the users can be shown in the channel list, realizing the display of all channels for the TV. By browsing the channel list, the user can select a target channel to watch a TV program. However, in practical applications, after the user opens the target channel, the user is often not interested in the TV program currently played on the target channel. The user has to switch channels one by one, and can finally determine a channel of interest only by watching a segment from each channel for a period of time to know the specific content played in the current program from each channel, resulting in long time-consuming and low efficiency for the user to determine a channel of interest.

SUMMARY

A display apparatus according to some embodiments of the disclosure may include: a display configured to display an image from broadcast system or Internet, and/or, a user input interface; a speaker configured to play audio; a remote control comprising a plurality of keys; and at least one processor in connection with the display, the speaker and the remote control. The at least one processor is configured to execute computer instructions to cause the display apparatus to: obtain channel information and a program preview image of a channel according to data stream received from a broadcast system, where the program preview image may be used to show program information currently being played on the channel, and the broadcast system may include ATSC 3.0 system; in response to receiving a command for displaying a channel list, display the channel information and the program preview image of the channel in a channel list interface on the display.

A method according to some embodiments of the disclosure may include: obtaining channel information and a program preview image of a channel according to data stream received from a broadcast system, where the program preview image may be used to show program information currently being played on the channel, and the broadcast system may include ATSC 3.0 system; in response to receiving a command for displaying a channel list, display the channel information and the program preview image of the channel in a channel list interface on a display of a display apparatus. Here, the display apparatus may include the display, a user input interface; a speaker configured to play audio; and a remote control comprising a plurality of keys.

DETAILED DESCRIPTION

In order to make the purposes and embodiments of the disclosure clearer, the exemplary embodiments of the disclosure will be described clearly and completely below in combination with the accompanying drawings in the exemplary embodiments of the disclosure. Obviously, the described exemplary embodiments are some embodiments of the disclosure but not all the embodiments.

It should be noted that the brief description of the terms in the disclosure is only for the convenience of understanding the embodiments described hereafter, and is not intended to limit the embodiments of the disclosure. Unless otherwise indicated, these terms should be understood according to the plain and ordinary meanings.

Figure 1:
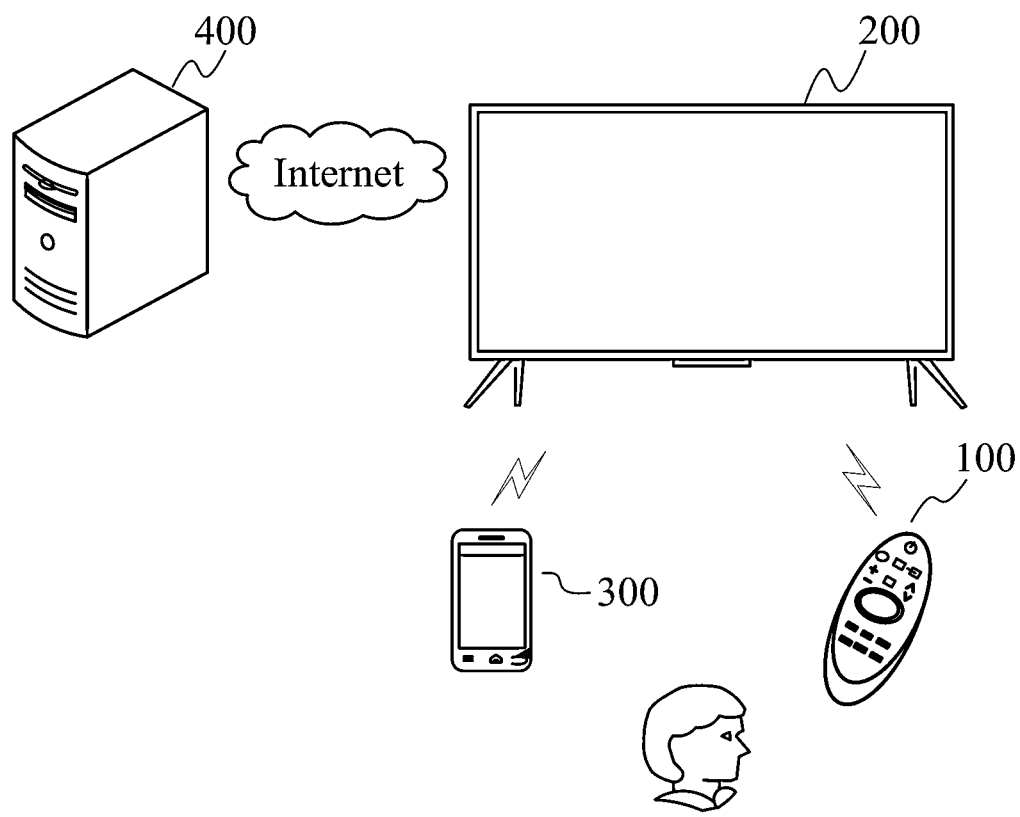
FIG. 1 shows an operation scenario of a display apparatus according to some embodiments.

FIG. 1 shows a schematic diagram of an operation scenario of a display apparatus according to some embodiments. As shown in FIG. 1, the display apparatus 200 also can communicate data with a server 400, and a user may operate the display apparatus 200 via a smart device 300 or a control device 100.

In some embodiments, the control device 100 may be a remote control, and can communicate with the display apparatus 200 according to infrared protocol, Bluetooth protocol, or other short-distance communication methods, to control the display apparatus 200 through wireless or other wired methods. A user can input user commands through keys, voice input and control panel on the remote control, to control the display apparatus 200.

In some embodiments, the smart device 300 may include any one of a mobile terminal, a tablet computer, a computer, a laptop computer, an AR/VR device, etc.

In some embodiments, the smart device 300 may be used to control the display apparatus 200 via, for example, an application program running on the smart device.

In some embodiments, the smart device 300 may also communicate data with the display apparatus.

In some embodiments, the display apparatus 200 may also be controlled in a manner other than the control device 100 and the smart terminal 300. For example, the user's voice command may be directly received by a module for acquiring voice commands configured inside the display apparatus 200, or the user's voice command may be received by a voice control device provided outside the display apparatus 200.

In some embodiments, the display apparatus 200 also can communicate data with the server 400. The display apparatus 200 may perform the communication and connection through a Local Area Network (LAN), a Wireless Local Area Network (WLAN), and other networks. The server 400 may provide various contents and interactions to the display apparatus 200.

Figure 2:
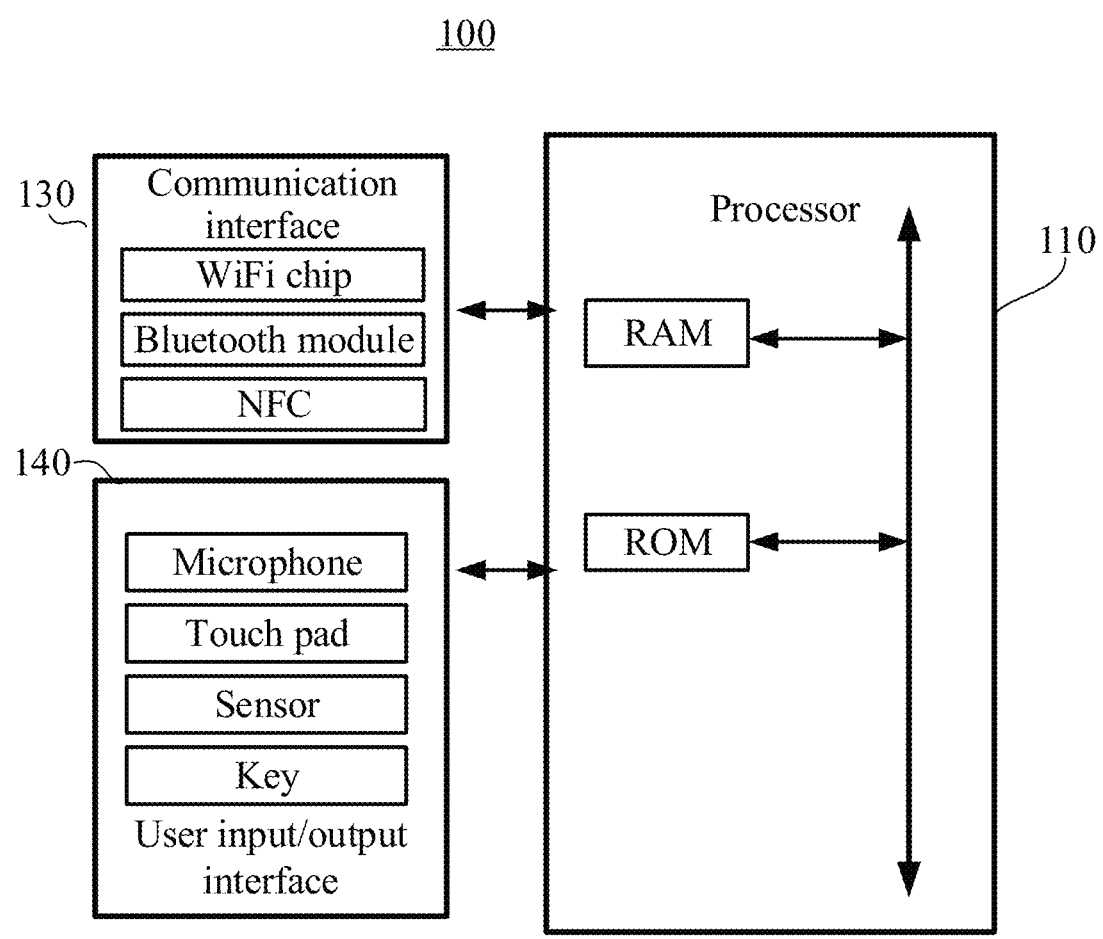
FIG. 2 shows a block diagram of a hardware configuration of the control device 100 according to some embodiments.

FIG. 2 shows a configuration block diagram of the control device 100 according to some embodiments. As shown in FIG. 2, the control device 100 may include a processor 110, a communication interface 130, a user input/output interface 140, a memory, and a power supply. The control device 100 may receive an operation command from a user and convert the operation command into an instruction that can be recognized and responded by the display apparatus 200, serving as an intermediary between the user and the display apparatus 200.

In some embodiments, the communication interface 130 is configured to communicate with external devices, including at least one of a WIFI chip, a Bluetooth module, an NFC or alternative module.

In some embodiments, the user input/output interface 140 may include at least one of microphone, trackpad, sensor, button or alternative module.

Figure 3:
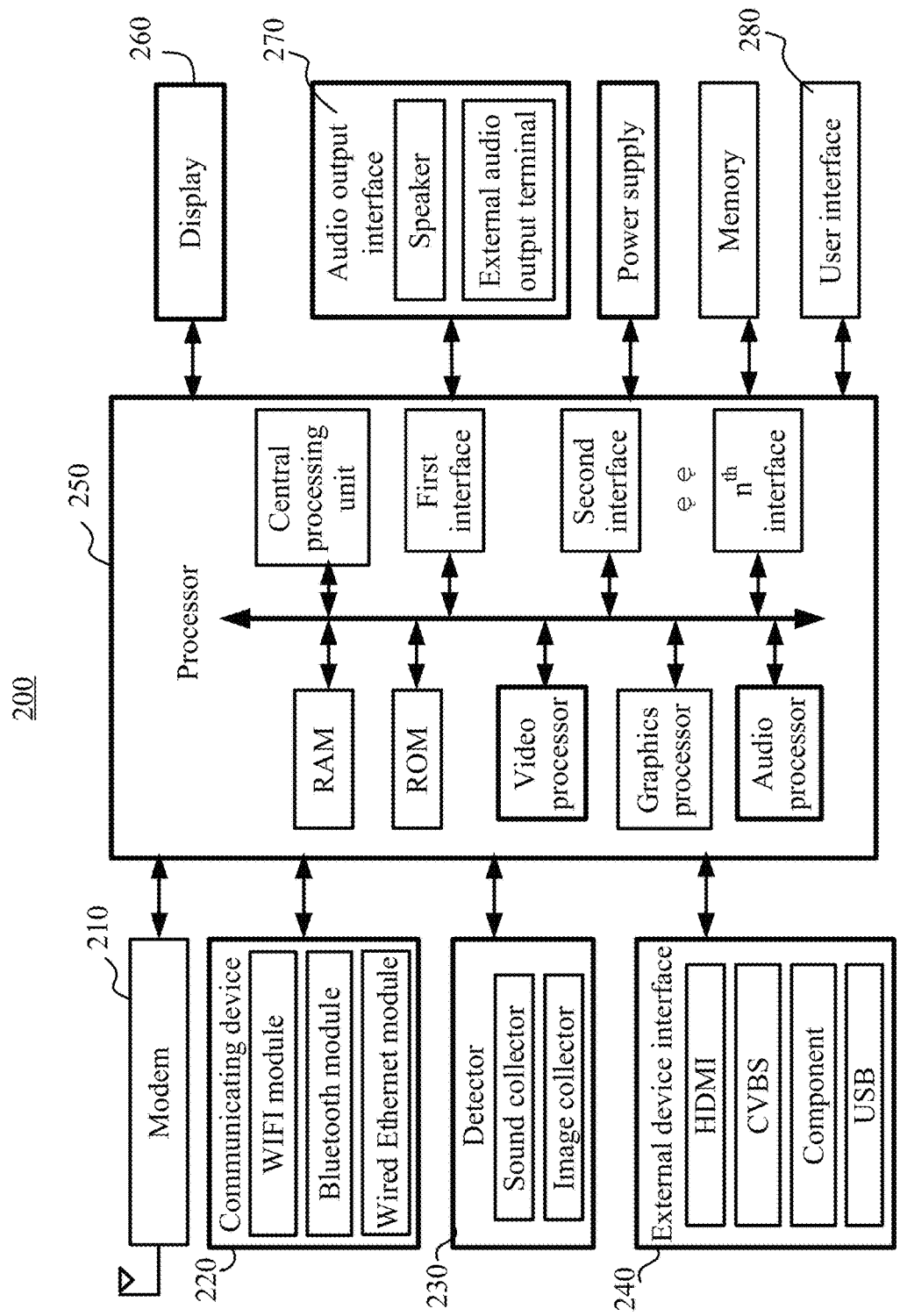
FIG. 3 shows a block diagram of a hardware configuration of the display apparatus 200 according to some embodiments.

FIG. 3 shows a block diagram of a hardware configuration of the display apparatus 200 according to some embodiments.

In some embodiments, the display apparatus 200 may include at least one of a modem 210, a communicating device 220, a detector 230, an external device interface 240, a processor 250, a display 260, an audio output interface 270, a memory, a power supply, a user interface.

In some embodiments, the processor may include one or more processors, such as a central processing unit, a video processor, an audio processor, a graphics processing unit, an RAM, an ROM, and first to $n^{th}$ interfaces for input/output.

In some embodiments, the display 260 may include: a panel component for displaying an image, a driver component for driving the image to display, a component for receiving an image signal output from the processor to display the video content, image content and a menu control interface, and a user interface, etc.

In some embodiments, the display 260 may be at least one of a liquid crystal display, an OLED display and a projection display, and may also be a projection device and a projection screen.

In some embodiments, the modem 210 can receive the broadcast television signals by a wired or wireless manner, and demodulates audio and video signals, such as EPG data signals, from a plurality of wireless or wired broadcast television signals.

In some embodiments, the communicating device 220 can be a component for communicating with an external device or server according to various types of communication protocols. For example, the communicating device may include at least one of a Wifi module, a Bluetooth module, a wired Ethernet module, other network communication protocol chip or near-field communication protocol chip, and an infrared receiver. The display apparatus 200 may establish the sending and receiving of control signals and data signals with the control device 100 or the server 400 through the communicating device 220.

In some embodiments, the detector 230 can be configured to collect data about external environment or the signal for interaction with outside. For example, the detector 230 may include a light receiver, which is a sensor configured to collect the intensity of the ambient light; or the detector 230 may include an image collector, such as a camera, which may be configured to collect external environment scenes, user attributes or user interaction gestures; or the detector 230 may include a sound collector, such as a microphone, which is configured to receive external sounds.

In some embodiments, the external device interface 240 may include, but is not limited to, any one or more of a High-Definition Multimedia Interface (HDMI), an analog or data high-definition component input interface (Component), a Composite Video Broadcast Signal (CVBS) input interface, a USB input interface (USB), an RGB port. The external device interface 240 may also be a composite input/output interface formed of a plurality of interfaces described above.

In some embodiments, the processor 250 and the modem 210 may be located in different separate devices, in this case, the modem 210 may be located in an external device (such as an external set-top box, etc.) of the main device where the processor 250 is located.

In some embodiments, the processor 250 can control the operations of the display apparatus and can respond to the user's operations through various software programs stored in the memory. The processor(s) can control the overall operation of the display apparatus 200. For example, in response to receiving a command for selecting a UI object displayed on the display 260, the processor(s) may perform the operations related to the object indicated by the user command.

In some embodiments, the processor(s) may include at least one of a Central Processing Unit (CPU), a video processor, an audio processor, a Graphics Processing Unit (GPU), an RAM (Random Access Memory), an ROM (Read-Only Memory), first to $n^{th}$ interfaces for input/output, a communication bus (Bus), etc.

In some embodiments, the video processor can be used to receive an external video signal and perform at least one of decompression, decoding, scaling, noise reduction, frame rate conversion, resolution conversion, image synthesis and other video processing according to the standard codec protocol of the input signal, to obtain a signal that can be displayed or played directly on the display apparatus 200.

In some embodiments, the video processor may include at least one of a de-multiplexing module, a video decoding module, an image synthesis module, a frame rate conversion module, a display formatting module, etc. Here, the de-multiplexing module can be used to de-multiplex an input audio and video data stream. The video decoding module can be used to process the demultiplexed video signal, including decoding and scaling, etc. The image synthesis module, such as image synthesizer, can be used to super-impose and mix the GUI signal generated by a graphics generator according to the user input or by itself with the scaled video image, to generate an image signal for display. The frame rate conversion module can be used to convert the frame rate of the input video. The display formatting module can be used to change the received video output signal after the frame rate conversion to a signal conforming to the display format, e.g., output an RGB data signal.

In some embodiments, the audio processor can be used to receive an external audio signal, and perform at least one of decompression, decoding, noise reduction, digital-to-analog conversion and amplification, etc. according to the standard codec protocol of the input signal, to obtain a sound signal that can be played in the speaker.

In some embodiments, the user may input a command on the Graphical User Interface (GUI) displayed on the display 260, and the user input interface can receive the command through the Graphical User Interface (GUI). Alternatively, the user may input a command by inputting a particular sound or gesture, and the user input interface recognizes the sound or gesture through the sensor to receive the user command.

In some embodiments, the user interface 280 may be used for receiving a control input (for example: physical keys on the display apparatus body, or others).

Figure 4:
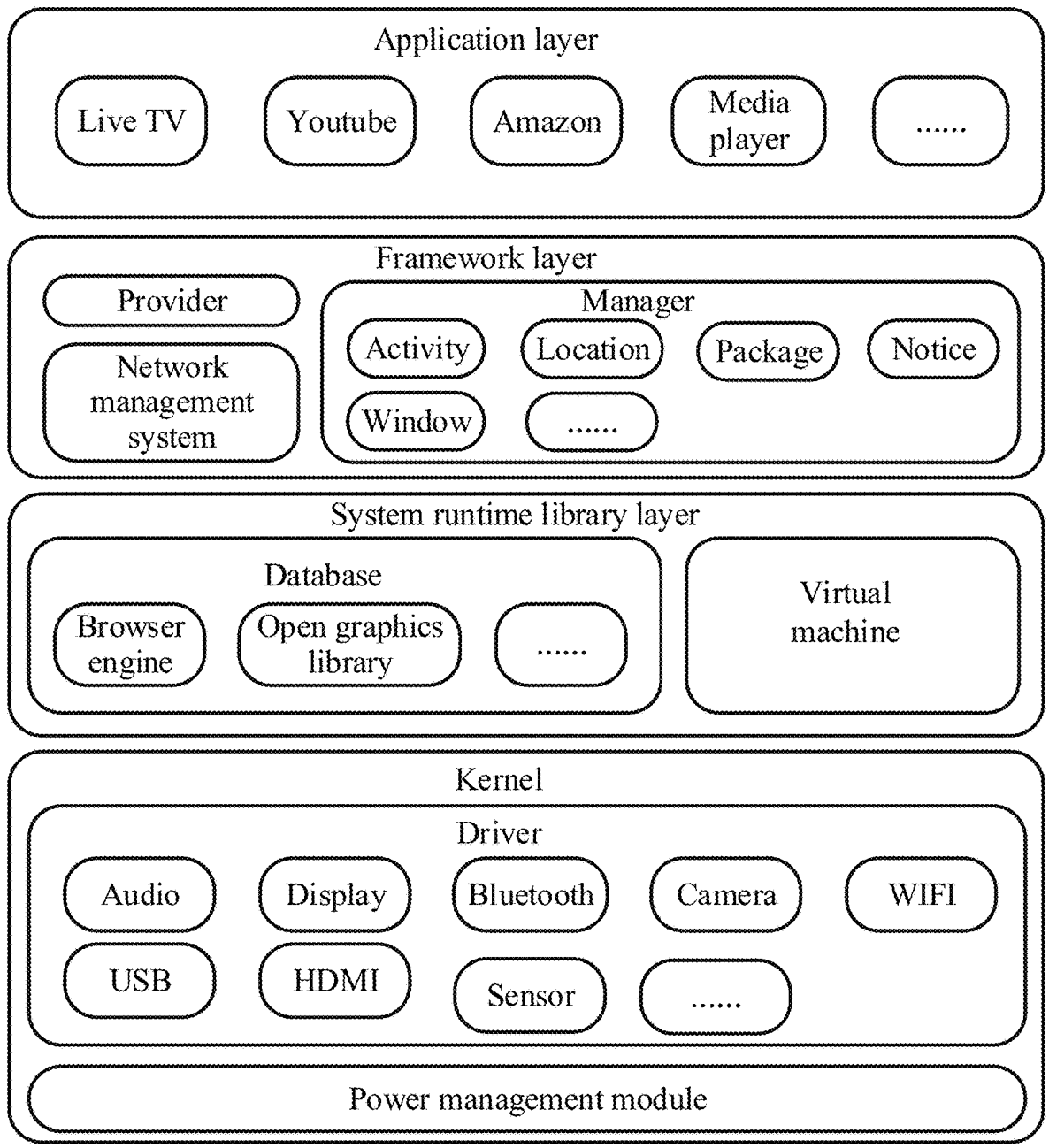
FIG. 4 shows a software configuration diagram in the display apparatus 200 according to some embodiments.

Referring to FIG. 4, in some embodiments, the system can be divided into four layers, which are, from top to bottom, an applications layer (referred to as "application layer" for short), an application framework layer (referred to as "framework layer" for short), an Android runtime and system library layer (referred to as "system runtime library layer" for short), and a kernel layer.

Figure 5:
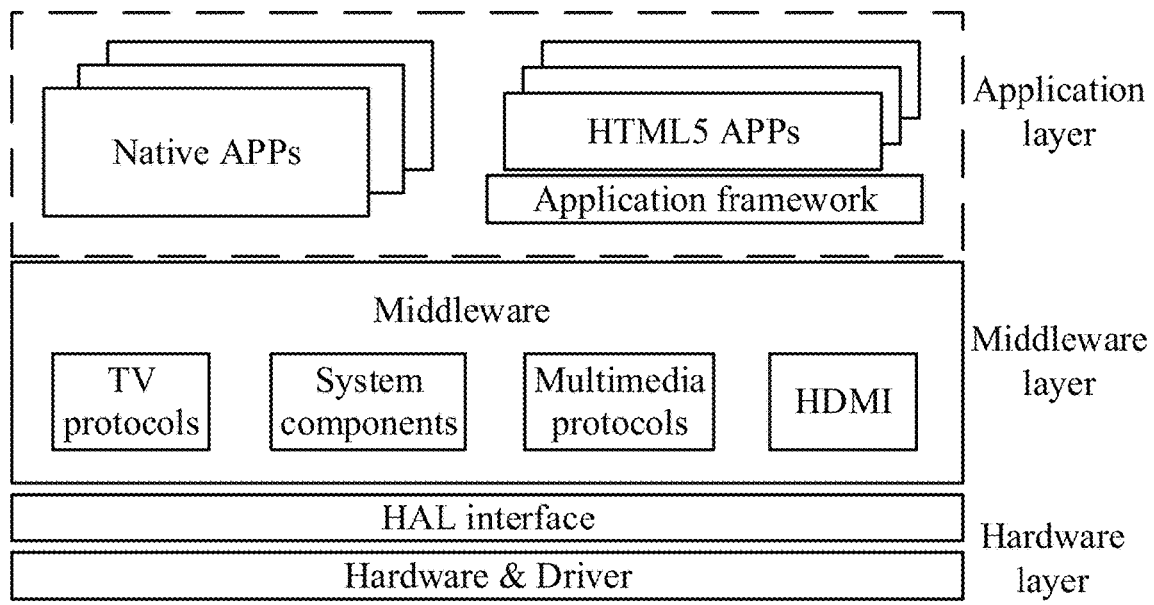
FIG. 5 shows a software configuration diagram in another display apparatus 200 according to some embodiments.

In some other embodiments, the software system of the display apparatus may also be divided as shown in FIG. 5, where the system of the display apparatus is divided into three layers, which are respectively an application layer, a middleware layer and a hardware layer from top to bottom.

The application layer may include common applications on TV and Application Framework, where the common applications can comprise applications developed based on Browser, such as: HTML5 APPs; and native applications (Native APPs).

The Application Framework can be a complete program model, with all the basic functions required by the standard application software, such as: file access, data exchange, . . . , and the use interfaces (toolbar, status bar, menu, dialog) of these functions.

The middleware layer may include middleware such as various TV protocols, multimedia protocols and system components. The middleware can use the basic services (functions) provided by the system software to connect various parts of the application system or different applications on the network, and can achieve the purpose of resource sharing and function sharing.

The hardware layer may include an HAL interface, hardware and drivers, where the HAL interface is a unified interface for all TV chips, and the specific logic is implemented by each chip. The drivers may include: audio driver, display driver, Bluetooth driver, camera driver, WIFI driver, USB driver, HDMI driver, sensor driver (such as fingerprint sensor, temperature sensor, pressure sensor, etc.), and power driver, etc.

The above embodiments describe the hardware/software architecture and function embodiments of the display apparatus. The display apparatus can be connected with a signal receiver (such as a set-top box, etc.) for a broadcast TV, and can be used to display program resources from various channels provided by the broadcast TV. In some scenarios, the user can view an EPG interface to know the program from each channel. The EPG interface may include a channel list, programs from channels in the channel list, and playing time periods of these programs. In some embodiments, the user can open the channel list in other manners (for example, a specific button on the remote control or a voice command, etc.), and the channel list only displays the channel information of all channels, where the channel information generally can include channel number, channel name/identifier, channel icon, etc. The user browses the channel list, knows the number of channels available locally and identifies each channel, so as to quickly find the channel of interest. For example, the user is interested in channel of CCTV-5 with channel number of 005, but finds that the channel of CCTV-5 is currently playing a snooker competition instead of the user's favorite sports live broadcast after opening the channel of CCTV-5 from the channel list, and then the user may have to change channels several times before he can find other channel programs of interest.

In this regard, the radio and television service provider can customize the program preview image corresponding to each channel according to the program information of the program being currently played on each channel. The program preview image is to intuitively, visually and clearly display and convey the program information to the user in the form of image, and the program information may include channel information and program identifier (ID). The channel information may include a channel number and a channel name, and the program ID may include a program name. Furthermore, the program information may also include, but is not limited to, a brief introduction of the program, the duration of the program, highlights of the program, etc.

In some embodiments, the program preview image can be a static image, for example, a video frame in the program video can be intercepted as the static background of the program preview image; or, the program preview image can be a dynamic image, for example, a plurality of continuous video frames in the program video can be intercepted to form a video segment, and this video segment is used as the dynamic background of the program preview image. The intercepted background image can be any frame/segment in the program video. Alternatively, in order to enhance the attractiveness of the program preview image, a video frame/video segment at the highlight moment in the program video can be intercepted, and then the text description of the channel program is superimposed on the background image, thus producing an illustrated program preview image, which not only improves the display effect of the program preview image, but also facilitates the user to select the channel program. The customization method and display effect of the program preview image are not limited to those described in the embodiments of the disclosure.

In some embodiments, for a live broadcast program, it may intercept a video frame or a video segment in advance, so it may customize a background image in the form of preview or poster.

In some embodiments, the broadcast television, as one of the signal sources of the display apparatus, generally transmits data streams to the display apparatus in the form of data streams. As such, the data stream can be configured to carry the channel information and program preview images of all channels, and the channel information and program preview images of all channels can be synchronously sent to the display apparatus through the data streams. After receiving the data stream, the display apparatus can parse and obtain the channel information and program preview images of all channels from the data stream, and store them in the local storage space. In response to receiving a command for displaying a channel list, the display apparatus can display the channel information and the program preview image of each channel in the channel list interface, so that the user can accurately know whether the program currently played in each channel has highlights of interest, so as to determine a channel of interest.

In some embodiments, the same channel may play different programs on different dates and time periods, so the service provider can pre-customize the program preview image of the program to be played in each channel in each time period according to the program schedule of each channel. When the program preview image of the channel is inserted into the data stream, it should be ensured to be aligned with the time stamp of the data stream. That is, the data stream should carry the preview image of the program for display in each channel at the time point corresponding to the time stamp. For example, a channel is actually playing program 1 at the current moment t1, and then the preview image of program 1 is transmitted at the time stamp t1 in the data stream, while the preview image of program 2 for display at the moment t2 will not be transmitted at the time stamp t1. The display accuracy of the channel list can be ensured, and the display apparatus can also monitor whether the program played in each channel changes according to the real-time data stream. If there is a change, the channel list will be refreshed.

In some embodiments, considering that there may be changes in the program schedule of channels, for example, the variety show A originally scheduled to be played at 21:30 pm on Aug. 27, 2021 in a satellite television channel may be temporarily suspended and replaced by the film B, the service provider needs to update the program preview image corresponding to the satellite television channel at the program change time point (i.e., 21:30 on Aug. 27, 2021) in time, that is, the program preview image 1 of the original variety show A is updated to the program preview image 2 from the film B, to ensure that the display apparatus can update the information in the channel list synchronously to avoid the display error of the program information in the channel list.

In some embodiments, after the broadcast TV service provider customizes a program preview image of a channel each time, the program preview image can be stored as a network resource, and an ICON URI (ICON Uniform Resource Identifier) for each program preview image is obtained. The ICON URI can be the resource network address of the program preview image, so that the TV data stream only needs to carry the ICON URI of the program preview image of each channel. After parsing the data stream, the display apparatus can obtain and access the ICON URI to determine the program preview image indicated by the ICON URI, and download and store the program preview image locally.

In some embodiments, taking a broadcast TV supporting the ATSC3.0 standard as an example, when the display apparatus can receive ATSC3.0 data stream, the display apparatus can obtain an SGDD (Service Guide Delivery Descriptor) and SGDU (Service Guide Delivery Unit) table from the ATSC3.0 data stream. Here, the service guide may include a plurality of data segments, and one or more data segments can be packaged into the SGDU. The SGDD can be used to describe the multicast session information for a file distribution session sending the SGDU, and provide the updated service guide description information and an obtaining method thereof.

In some embodiments, the SGDD and SGDU table may include a Service segment. Optionally, the channel information, the program identifier, and the ICON URI of the program preview image for each channel can be recorded in the Service segment, where the program identifier can be seen as an equivalent to the ID of the channel program and can be used to distinguish different programs, and the program identifier can be, for example, the program name, the preset program number/code, etc. For one channel, the channel information, the program identifier and the ICON URI of the program preview image are mapped to each other. For example, {CCTV-5, Women's singles final of table tennis, ICON URI5} means that "Women's singles final of table tennis" (that is, the program name is used as the program identifier) is currently played in the channel CCTV-5), and the program preview image of the program can be found and downloaded by visiting the ICON URI5. Therefore, after obtaining the SGDD and SGDU table from the ATSC3.0 data stream, the display apparatus can parse and obtain the Service segment from the SGDD and SGDU table, and then read the channel information of all channels and download the program preview images, so as to display a corresponding channel list. It should be noted that the content configuration of the data stream by the service provider and the manner in which the display apparatus can obtain the channel program information are not limited to those described in the embodiments of the disclosure.

In some embodiments, the display apparatus can maintain a correspondence list that describes the correspondence corresponding to each channel, and the correspondence may include but not limited to a correspondence among channel information, program identifier and image resource address (i.e., ICON URI), where the channel information may include but not limited to channel number, channel name, channel icon, etc. The channel information can be generally constant, while the program identifier and image resource address are variable. For example, when a program played in a channel changes, the program identifier must be changed, and the image resource address may or may not be changed.

In some embodiments, the service provider can assign different ICON URIs for the program preview images for different program identifiers during configuration. In this case, each program preview image that has been produced has a globally unique ICON URI. For example, for the channel CCTV-1, the preview image of the program 1 is stored in ICON URI1, and the preview image of the program 2 is stored in ICON URI2, and then the display apparatus needs to visit different network addresses to download the program preview images of different programs in the same channel according to the data stream instruction.

In some embodiments, the channel list generally only displays the programs currently played in channels and does not display the programs that have been played before (that is, historical programs), so a fixed corresponding ICON URI can be assigned to each channel. When the channel program is changed, the ICON URI remains unchanged, but the program preview image located in the ICON URI is replaced. For example, for channel CCTV-6, the program preview image 1 of the currently played program 1 is stored in ICON URI6. When program 1 switches to program 2, the program preview image 1 originally stored in the ICON URI6 address is deleted, and the ICON URI6 is used to store the program preview image 2 corresponding to program 2, so that the display apparatus can always access the same ICON URI6 to re-download the program preview image when detecting the program update of CCTV-6 according to the data stream.

In some embodiments, after one program preview image has been assigned with an ICON URI, the program preview image will generally not be transferred to other ICON URIs.

In some embodiments, if the program identifier changes, this indicates that programs from the channel must have been switched. The case of whether the image resource address changes or not determines which ICON URI the display apparatus can access to download and update the program preview image of the channel. Accordingly, there may be four cases according to the program identifier and ICON URI.

Case 1. If the program identifier and ICON URI of channel A have not changed, this indicates that the program currently played in channel A has not finished, the display apparatus determines that the program of channel A has not been switched, and then the program preview image for channel A in the channel list remains unchanged.

Case 2. The program identifier of channel A has not changed but the ICON URI changes, indicating that programs from channel A has not been switched but the service provider has changed the resource address of the current program preview image of channel A, so the display of the channel list on the display apparatus is not affected, that is, the program preview image for channel A in the channel list remains unchanged.

Case 3. Both the program identifier and ICON URI of the channel have changed. For ease of distinctive description, this type of channel is denoted as the first target channel. The display apparatus traverses the correspondence list to find whether there is a first target channel in the correspondence list. In response to no first target channel being found, the program preview image of each channel remains unchanged; in response to the first target channel being found, for example, the first target channel is channel B and the image resource address of channel B is updated from ICON URI2 to ICON URI3, then the display apparatus can access the updated ICON URI3 of channel B, download and store the new program preview image of channel B, and refreshes the program preview image of channel B in the channel list interface, so that the display apparatus synchronously updates the channel list as the channel program switches.

In some embodiments, the channel list generally displays the information on the real-time program being played in each channel, and does not display the information on a historical program that played previously. Likewise, the previous and old program preview image of channel B has expired. Therefore, when downloading the new program preview image of channel B, the display apparatus can synchronously delete the old program preview image of channel B stored before, to realize the replacement and update of the program preview image of each channel, and also release the storage space occupied by the expired image.

Case 4. The program identifier of channel A changes but the ICON URI remains unchanged. For ease of distinctive description, this type of channel is denoted as the second target channel. The display apparatus traverses the correspondence list to find whether there is a second target channel in the correspondence list. In response to the second target channel being found, for example, the second target channel is channel C, then the program identifier corresponding to channel C changes, that is, a new program has been played in the channel C. The image resource address of channel C remains to be ICON URI8 and unchanged, but the program preview image stored in ICON URI8 is updated. Then the display apparatus can still access the ICON URI8 originally corresponding to the channel C, download and store a new program preview image of channel C at this address, delete the old program preview image of channel C, and refresh the program preview image of channel C in the channel list interface, so that the display apparatus synchronously updates the channel list as the channel program switches.

Through the above update mechanism, the program preview image is only refreshed for the target channel whose program identifier has changed, while there is no need to repeatedly download the program preview images for other channels without program switch, thereby avoiding problems such as the display delay of the program preview image and the increased CPU operating load caused by multiple repeated downloads, ensuring that the program preview image of each channel is always instant, effective and available, and improving the accuracy, stability and reliability of the channel list displayed on the display apparatus side.

In some embodiments, when the display apparatus is playing a program from a channel or displaying an application page, the user can open the channel list at any time by inputting a command, for example, clicking a channel list button configured on the panel of the remote control, or clicking a channel list control on the interface of the display apparatus, or inputting a command for displaying the channel list by voice, etc.

The channels are diverse and rich in regions, program themes and categories, etc. For example, the channels can be divided into CCTV and various local satellite televisions according to regions, and can be divided into sports channel, finance channel, movie channel, entertainment channel, children's channel, opera channel, etc. according to program themes and categories, resulting in dozens or even hundreds of channels supported by the broadcast television. In the disclosure, the channel list not only displays the channel information of each channel, but also synchronously displays the program preview image of each channel. Since each program preview image will occupy a certain interface area when displayed, the number of images that the channel list interface can display is limited.

The channel list interface can use pages as display units to display the channel list page by page. Assuming that the total number of channels provided by the broadcast television is M and the display apparatus plans to display up to N channels per page, the total number P of pages is [M/N], that is, M/N is rounded up. For example, the total number M of channels is 147, and 6 channels are displayed on each page, so the total number P of pages is determined as 25, where the 25th page only displays 3 channels. The user can quickly browse and switch the channel list by the page switching.

For example, the user is currently watching the $k^{th}$ page. If k=1, the user can only turn to the next page, but cannot turn up; if 1<k<P, the user can turn down to the k+1th page, or can turn up to the k−1th page, so as to return to the previous page for review; if k=P, the user can only turn to the previous page, but cannot turn down.

Each channel has a corresponding channel number, for example, the channel number of CCTV-1 is 001, the channel number of CCTV-2 is 002, etc. For example, the channels can be sorted and displayed according to the channel numbers, and optionally sorted according to the increasing order of the channel numbers. The display apparatus supports to display N channels on each page, and then the $((k-1)*N+1)^{th}$ to $(k*N)^{th}$ channels are loaded and displayed in the channel list on the $k^{th}$ page, where 1≤k≤P. Taking N equal to 6 as an example, the first page displays the first 6 channels in sequence, that is, the channel numbers are 001 to 006 sequentially; the second page displays the $7^{th}$ to $12^{th}$ channels in sequence, that is, the channel numbers are 007 to 012 sequentially, and so on, until the channel display on the $P^{th}$ page is completed.

The sorting method of the channels in the channel list is not limited. In other exemplary embodiments, for example, the channels are sorted in the descending order of the channel numbers; or, the historical channel viewing list is recorded, and the channels are sorted according to the viewing frequency, for example, the more frequently a channel is viewed, the higher the channel is ranked; or, the user can set a priority rule for channel display according to his or her own viewing preferences and interests, and sort the channels according to the priority rule, so that the user's favorite channels can be displayed preferentially, reducing the time spent by the user on looking for a channel of interest from the channel list, and improving the user experience.

Figure 6A:
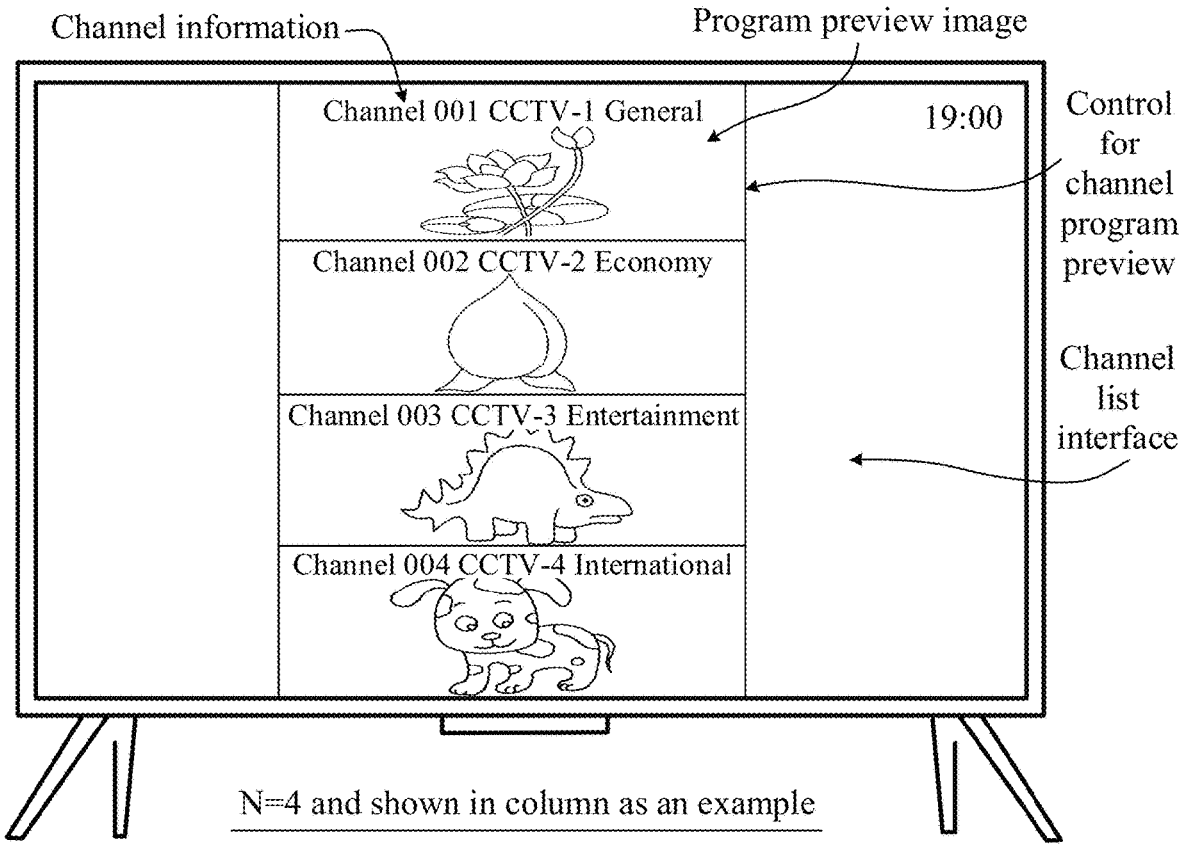
FIG. 6A shows a UI example of a first channel list interface.
Figure 6B:
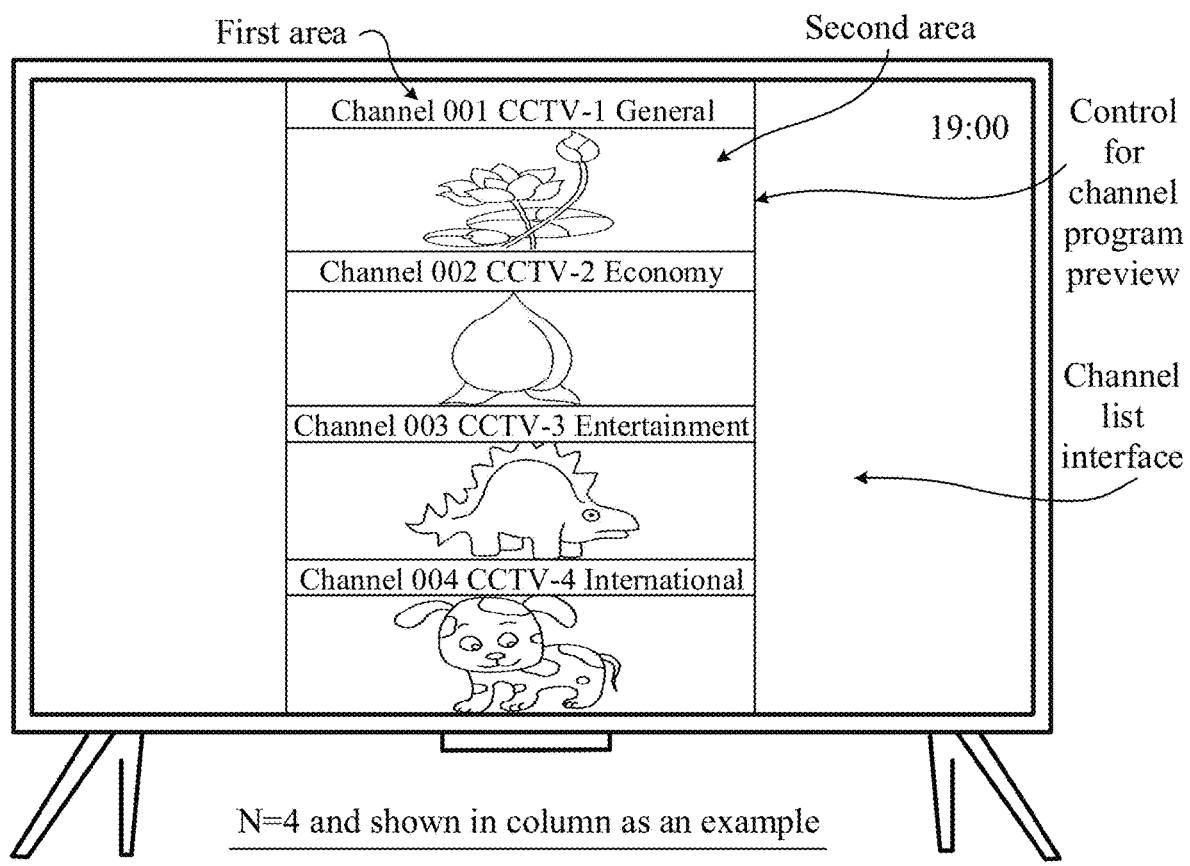
FIG. 6B shows a UI example of a second channel list interface.

In some embodiments, in the channel list interface shown in FIG. 6A and FIG. 6B, for one page of the channel list, the display apparatus can generate N controls for channel program preview, where each control for channel program preview is used to display the channel information and the current latest program preview image of the channel. Optionally, the value of N may be adaptively set according to the panel resolution of the display apparatus, and is not specifically limited in the disclosure.

In some embodiments, when a program preview image is loaded and displayed in a control for channel program preview, the program preview image can be appropriately scaled so that the size of the program preview image fits the available area of the control for channel program preview, which can not only avoid the program preview image from exceeding the limited area of the control for preview due to the too large size, to thereby avoid problems such as interaction or coverage between program preview images of adjacent channels, but also avoid the problem that the user cannot see the details of the image clearly due to the too small size of the program preview image, to thereby improve the display effect of the channel list.

In some embodiments, referring to the example in FIG. 6A, the control for channel program preview can be set as a rectangular frame structure. After the program preview image is scaled, if the image size fits the overall rectangular frame, the program preview image becomes the background image of the control for channel program preview, and the corresponding channel information is shown in a floating layer above the program preview image. In this embodiment, for example, the channel information can be displayed in the upper portion of the blank area in the program preview image, so as to avoid the channel information from overlapping with the program information in the image, and improve the display effect of the control for channel program preview.

In some embodiments, referring to the example in FIG. 6B, the control for channel program preview can include a first area and a second area, where the first area is used to present the channel information, and the second area is used to present the program preview image. In this case, the internal area of the control is divided, so that separately and independent display of the channel information and the program preview image is realized. In this embodiment, when the program preview image is loaded and displayed, the program preview image needs to be scaled to adapt the size of the second area. The specific display form of each control for channel program preview is not limited.

In some embodiments, each page of the channel list can display channels according to a preset layout, where the preset layout not only indicates the maximum number of controls for channel program preview that can be displayed in each page of the channel list (that is, the value of N), but also indicates the position distribution of the N controls for channel program preview in the channel list interface. In this way, when the channel list interface is displayed, N controls for channel program preview are firstly generated, arranged and displayed according to the preset layout, and the program preview images sorted in the first N positions are loaded and displayed in the channel list on the first page. Afterwards, the channel list interface may be updated according to a command for channel switch on the channel list interface from the user.

In some embodiments, the display apparatus can only generate N controls for channel program preview, and the P-page channel list can share these N controls for channel program preview. In this case, when the user turns pages each time, there is no need to generate new controls for channel program preview, and only a need to change the channels associated with the existing control for channel program preview. After displaying the channel list interface, the number of pages in the current channel list is recorded. While taking the page down, based on that detecting that the $k^{th}$ page is switched to the $(k+1)^{th}$ page, the display of the channel program information of the $((k-1)*N+1)^{th}$ to $(k*N)^{th}$ channels on the N controls for channel program preview is cancelled, where the channel program information can include the channel information and program preview image corresponding to the same channel, and the N controls for channel program preview can be updated to display the channel program information of the $(k*N+1)^{th}$ to $((k+1)*N)^{th}$ channels, thereby replacing the channel list on the $k^{th}$ page with the channel list on the $(k+1)^{th}$ page. In this embodiment, at most N controls for channel program preview can be created and maintained, and the processing load of the CPU can be reduced. However, since N program preview images need to be reloaded from the memory and scaled each time the page is turned, especially when the page is turned up, there is still a delay in image preview and display.

In some embodiments, the number of channels included in the channel list on the last page may be less than N. For example, the total number M of channels is 86, and 6 channels are displayed on each page, so the total number P of pages is determined as 15, where each of the first 14 pages shows information of 6 channels, and the 15th page as the last page shows information of only 2 channels. Thus, when the user scrolls down to the 15th page, the channel list on the 15th page shows only two channel program preview controls, and these two controls are sorted and displayed at the first two positions in the preset layout.

In some embodiments, the display apparatus may decide whether to generate a new control for channel program preview according to a command from the user. After the channel list interface is displayed, the page number of the current channel list is recorded. If the user stops scrolling the page down while viewing the $k^{th}$ page, there is no need to generate a new control for channel program preview, and the channels associated with the currently existing k*N controls for channel program preview remain unchanged.

In some embodiments, if the $k^{th}$ page is switched to the $(k-1)^{th}$ page, there is no need to generate a new control for channel program preview, and it is only necessary to make the channel list on the $(k-1)^{th}$ page to cover the channel list on the $k^{th}$ page. In this case, the channels associated with the currently existing k*N controls for channel program preview remain unchanged.

In some embodiments, if the $k^{th}$ page is switched to the $(k+1)^{th}$ page, that is, when the page is turned down, N controls for channel program preview can be generated additionally. In this case, the total number of controls for channel program preview has accumulated to (k+1)*N, where the channels associated with the first k*N controls for channel program preview remain unchanged, and the newly-generated N controls for channel program preview show the channel program information of the $(k+N+1)^{th}$ to $((k+1)*N)^{th}$ channels.

As an example, it is assumed that N is equal to 6. When the user inputs a command for displaying the channel list interface, 6 controls for channel program preview are firstly generated and arranged according to the preset layout and are sequentially associated with the first 6 channels, and the program information of the first to sixth channels is displayed, thus displaying the channel list on the first page. If the user scrolls down to the second page, then 6 more controls for channel program preview are generated and sequentially associated with the $7^{th}$ to $12^{th}$ channels, and the program information of the $7^{th}$ to $12^{th}$ channels is displayed, thus generating the channel list on the second page and making the second page to cover the first page. In response to returning to the first page from the second page, the channels associated with the 6 controls for channel program preview included on the first page are not changed and not replaced by other channels, so there is only a need to make the first page to directly cover the second page without repeatedly loading the first 6 program preview images from the memory and repeatedly scaling and adjusting the first 6 program preview images, thereby solving the problem of picture preview delay while turning up pages, improving the image preview speed, and optimizing the user experience.

In some embodiments, in the method of additionally generating new controls for channel program preview according to the command for page switching from the user, the number of channels included in the channel list on the last page may be less than N. In this case, in response to receiving a command for turning page down from the user, the display apparatus determines whether the next page is the last page (that is, $P^{th}$ page). In response to the next page being not the last page, N new controls for channel program preview are directly generated; in response to the next page being the last page, Q controls for channel program preview are generated, where Q is the number of channels actually included in the channel list on the last page, $1 \leq Q \leq N$, and Q=MN*(P−1). After generating the Q controls for channel program preview on the last page, the Q controls for channel program preview are displayed in sequence according to the first Q display positions in the preset layout, and the channel program information of the $(M-Q+1)^{th}$ to $M^{th}$ channels are displayed in the Q controls for channel program preview.

In some embodiments, referring to the examples in FIG. 6A and FIG. 6B, for one page of channel list, the preset layout is configured in such a way that N controls for channel program preview are vertically and sequentially arranged from top to bottom. i.e., presentation in column. The user may, for example, click the up and down keys on the remote control to select the control for channel program preview where the focus lands.

Figure 7:
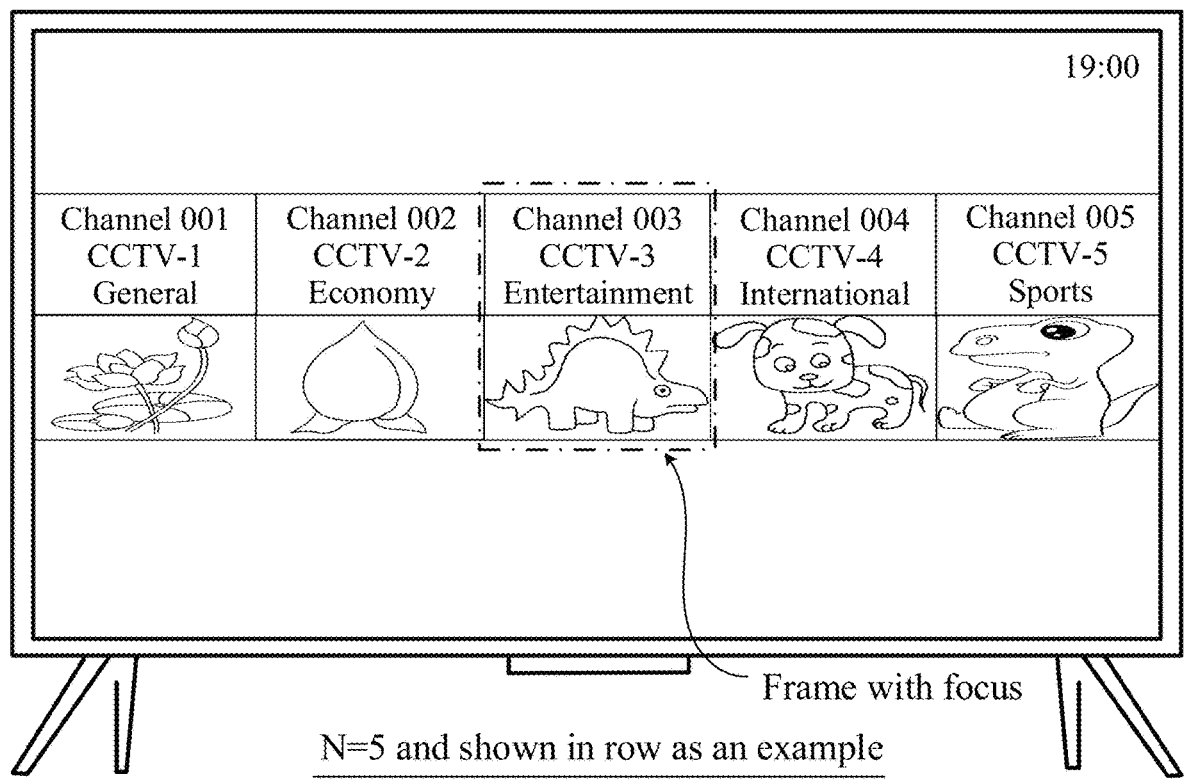
FIG. 7 shows a UI example of a third channel list interface.

In some embodiments, referring to the example in FIG. 7, for one page of channel list, the preset layout may be configured in such a way that N controls for channel program preview are horizontally and sequentially arranged from left to right, i.e., presentation in row. The user may, for example, click the left and right keys on the remote control to select the control for channel program preview where the focus lands.

Figure 8:
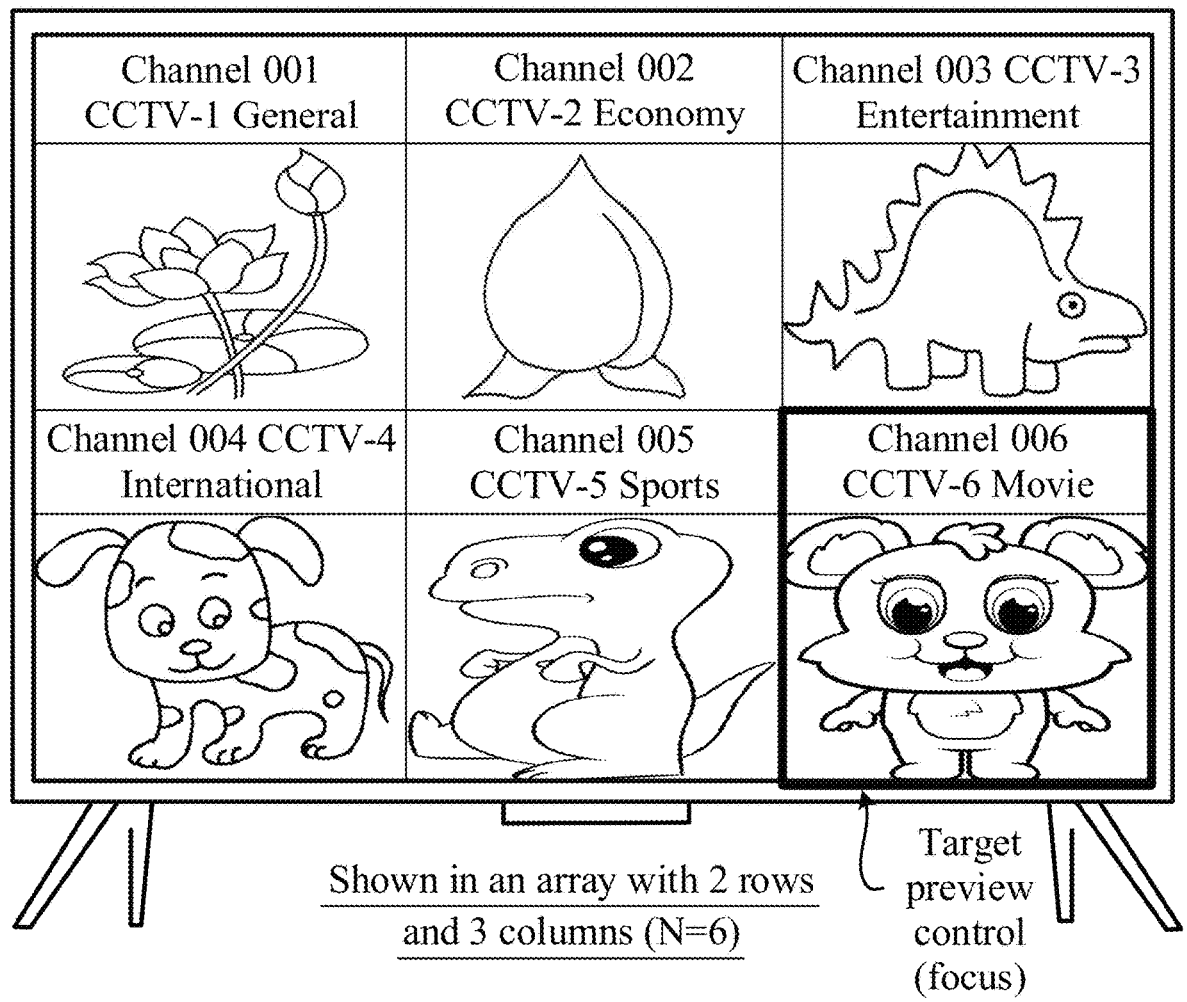
FIG. 8 shows a UI example of a fourth channel list interface.

In some embodiments, referring to the example in FIG. 8, for one page of channel list, in order to make the distribution of multiple controls for channel program preview more compact, improve the display effect of the channel list interface and reduce the blank space of the interface, the preset layout can adopt A*B matrix display mode, that is, the control for channel program previews are arranged in an array with A rows and B columns, and in this case, N=A*B, where the value of A and the value of B may be equal or unequal. For example, the array with 2 rows and 3 columns is used in FIG. 8, where each page may include a total of 6 controls for channel program preview. The user can move the focus by operating the direction keys on the remote control. For example, if the down or right key on the remote control is selected once, the focus moves to a control in a next position ranked in sequence; if the user selects the up or left key on the remote control once, the focus moves to a control in a previous position ranked in sequence. It should be noted that the preset layout is not limited to the examples provided in the embodiments of the disclosure.

In some embodiments, the user can switch the control with focus in the channel list by operating the remote control. Optionally, the display apparatus may display the control with focus. For example, a rectangular frame encloses the control with focus in FIG. 7, and the highlight effect may be set for the frame by, for example, setting the line type, line thickness and color of the frame. For another example, the special effect of highlight is added to the edge of the control with focus in FIG. 8. The manner of displaying the control with focus visually is not limited to the examples in the embodiments of the disclosure. For example, the control with focus may be appropriately scaled to make the control with focus different from other controls without focus in size, and so on. By highlighting the control with focus in the channel list, the user can intuitively distinguish the control position where the focus lands, so as to accurately locate the control for channel program preview currently selected.

Figure 9:
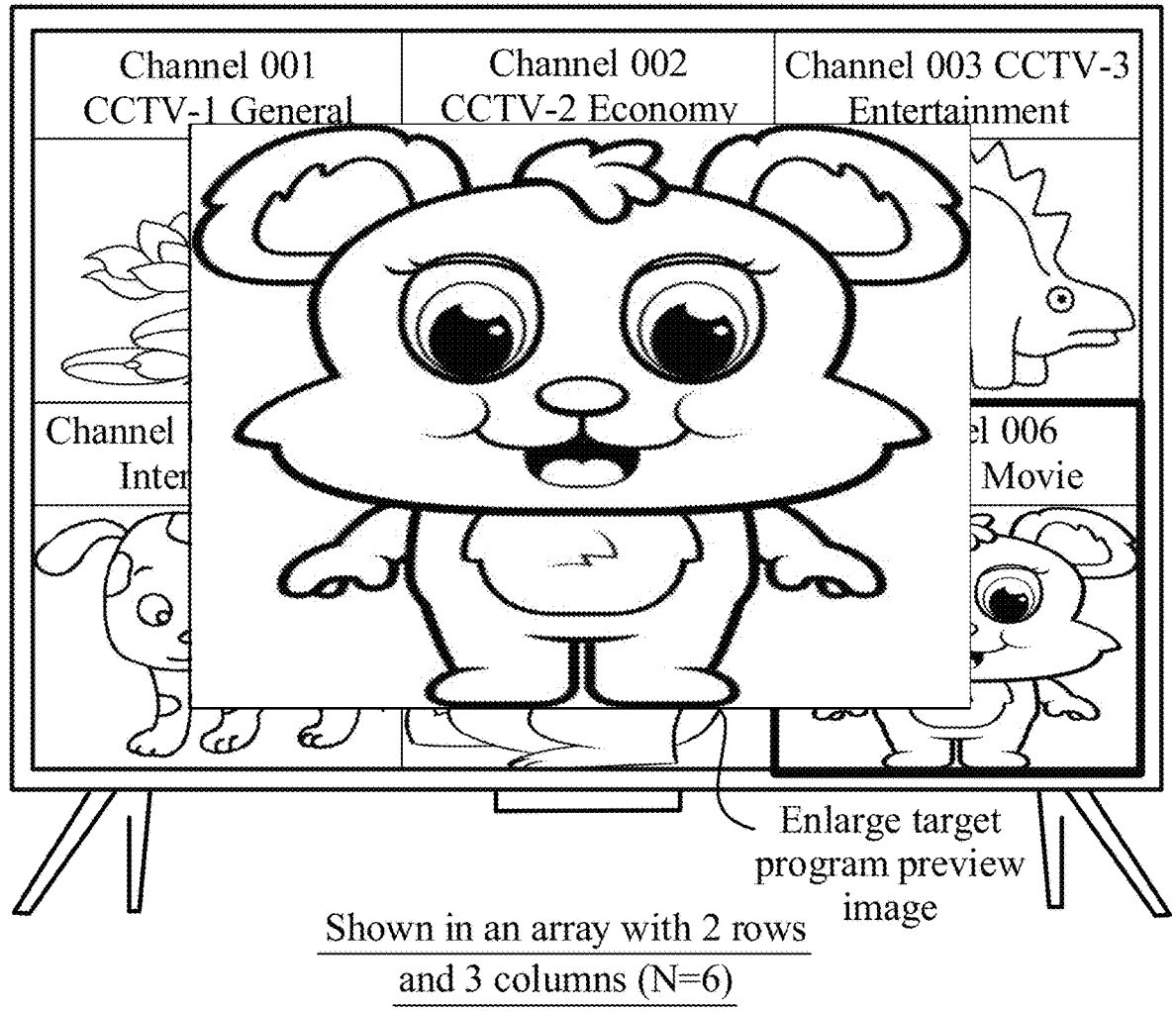
FIG. 9 shows a UI example after amplifying the target program preview image.

In some embodiments, due to the limited size of the control for channel program preview, the program preview image displayed in the control is relatively small, and the program preview image can be enlarged according a command from the user. Optionally, when the first preset operation from the user is received, the target control for preview where the focus currently lands is queried, and then the target program preview image in the target control for preview is enlarged and displayed. Taking FIG. 8 as an example, the user moves the focus to the sixth control for channel program preview and inputs the first preset operation, and then the display apparatus determines that the last control in the channel list on this page is designated as the target control for preview. As shown in FIG. 9, the display apparatus can automatically enlarge the sixth channel program preview image according to a certain ratio, so that the graphics and texts in the program preview image are simultaneously enlarged, improving the user preview effect.

Figure 10:
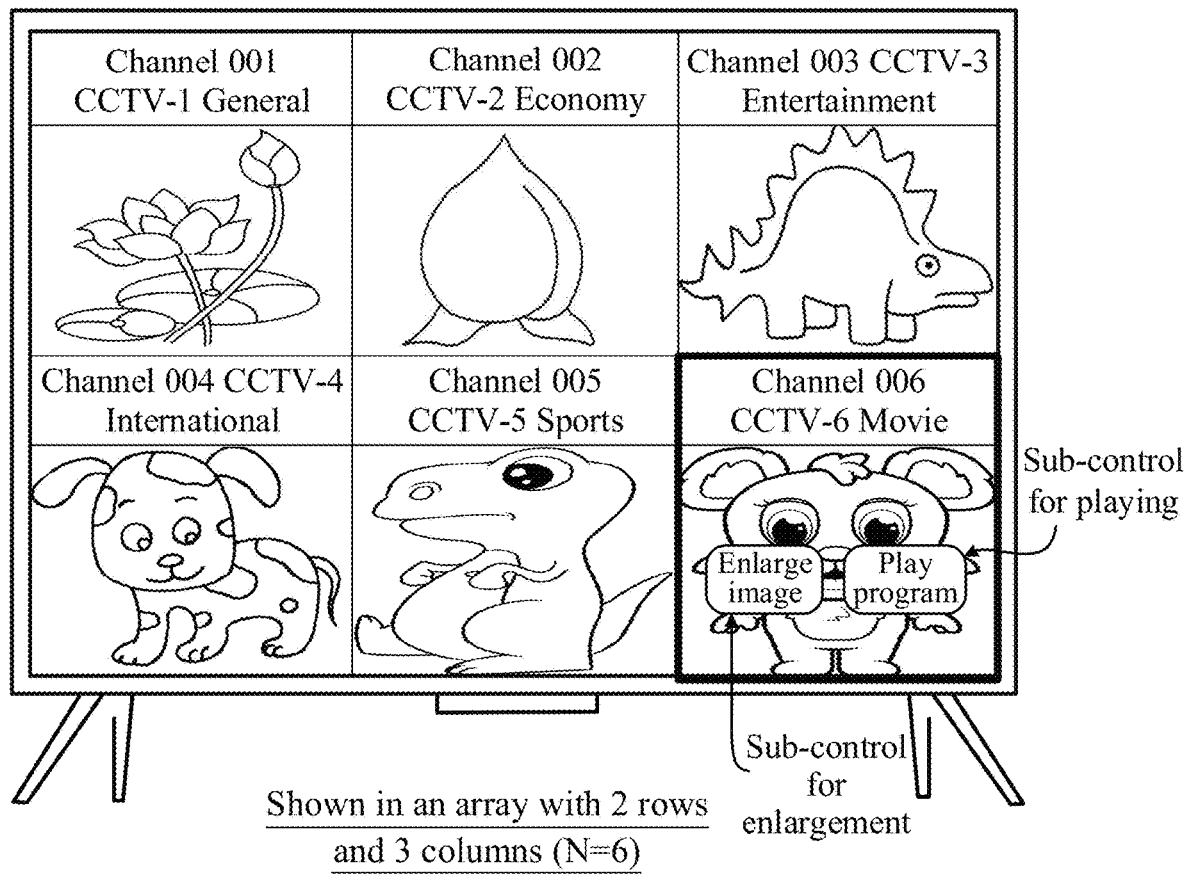
FIG. 10 shows a UI example of a fifth channel list interface.

In some embodiments, the first preset operation is not limited. For example, the first preset operation is that the user clicks the program preview image in a current control with focus, where the click manner is not limited to click, double-click, long press, etc.; for another example, the first preset operation is a command for image enlargement from the user through voice control; for another example, the first preset operation is that the user presses a button on the remote control. For example, after selecting the control with focus, the user presses the confirm key/OK key on the remote control to enlarge the program preview image. For another example, as shown in FIG. 10, a sub-control for enlargement may be set in each control for channel program preview, and the first preset operation is the user's selection of the sub-control for enlargement.

By moving the focus, the user can finally determine the channel corresponding to the program of interest. In a conventional way, the user can remember the channel number of the channel of interest, and then use the number keys on the remote control to input the channel number, and then the display apparatus can automatically skip to the corresponding channel to play the TV program. Alternatively, the display apparatus supports the user to quickly open a channel on the channel list interface, so as to quickly locate and watch the channel program.

In some embodiments, when a second preset operation from the user is received, the target control for preview where the focus currently lands is queried, then the channel list interface is closed, and the channel program corresponding to the target control for preview is automatically open and displayed. Taking FIG. 7 as an example, the user moves the focus to the third control for channel program preview and inputs the second preset operation, and then the display apparatus determines that the third-ranked control in the channel list on this page is designated as the target control for preview. And, according to the channel information corresponding to the target control for preview, the background automatically switches channels, for example, to the channel CCTV-3 corresponding to 003, so that the display can display the variety show being played in CCTV-3 at the current time.

In some embodiments, the second preset operation is not limited. For example, the second preset operation is that the user clicks on the channel information in the current control with focus, such as clicking on any one of the channel number, channel icon and channel name, to enable automatic switching; for another example, the second preset operation is a command for playing a channel program from the user through voice control; for another example, the second preset operation is that the user presses an associated key specified on the remote control. After the user selects the control with focus, for example, the user presses the TV key or channel key on the remote control, to control the display apparatus to automatically open the selected channel and play the corresponding channel program. For another example, as shown in FIG. 10, a sub-control for playing is set in each control for channel program preview, and the second preset operation is the user's selection of the sub-control for playing.

The sub-control for enlargement and the sub-control for playing can generally be enabled in the target control for preview with focus. Optionally, referring to the example in FIG. 10, for a control for channel program preview not selected and without focus, the sub-control for enlargement and the sub-control for playing may be hidden. When the focus moves to a control for channel program preview, two sub-controls are available, and the sub-control for enlargement and the sub-control for playing are simultaneously displayed in this control for channel program preview, for the user to choose whether to enlarge the program preview image and whether to play the selected channel program.

In some embodiments, when browsing channels by page switching, referring to the example in FIG. 8, in one page of channel list, channels in the list can be switched by moving the focus. When the focus lands on the last control for channel program preview on the current page, the user only needs to select the down or right key on the remote control again to switch to the next page, and the focus moves to the first control for channel program preview on the next page. In this case, when the focus lands on the last control of the channel list on each page, the user may be about to turn the page to the next page, so the program preview images corresponding to N or Q (on the last page) channels included in the next page are loaded into the memory in advance, so that the images pre-loaded in the memory can be quickly displayed in the corresponding controls for channel program preview when the user actually turns down to the next page later, reducing the delay that occurs while turning pages to display the program preview images of the new channels, improving the refresh efficiency and image preview speed of the channel list interface while page switching, and optimizing the use experience of the user.

In some embodiments, the focus position is tracked in real time according to the user's operation for channel switching in the channel list interface. When it is detected that the focus lands on the $(k*N)^{th}$ control for channel program preview, that is, the focus lands on the $N^{th}$ (the last position on a single page) control for channel program preview on the $k^{th}$ page, it is detected whether the $(k+1)^{th}$ page is the last page, that is, whether k is equal to (P−1) or whether (k+1) is equal to P.

In some embodiments, if the $(k+1)^{th}$ page is the last page, that is, k is equal to (P−1), then the program preview images of the $(k*N+1)^{th}$ to $(k*N+Q)^{th}$ channels are loaded into the memory in advance and wait for display, where 1≤Q≤N and Q=MN*(P−1). Then, in response to receiving a user's operation for switching to a next channel (equivalent to the user's operation for switching to the $(k+1)^{th}$ page), the $(k*N+1)^{th}$ to $(k+N+Q)^{th}$ program preview images loaded instantly from the memory are scaled and then displayed in sequence in Q control(s) for channel program preview on the $(k+1)^{th}$ page of the channel list, so that the $(k+1)^{th}$ page of the channel list covers the $k^{th}$ page of the channel list, to refresh the channel list interface quickly. The embodiments can eliminate the time consumed by loading the program preview images from the local storage to the memory, and then the Q control(s) for channel program preview on the $(k+1)^{th}$ page of the channel list are enabled and the channel program information is displayed after it is determined that the user actually turns pages.

In some embodiments, if the $(k+1)^{th}$ page is not the last page, that is, k is less than (P−1), then the program preview images of the $(k*N+1)^{th}$ to $((k+1)*N)^{th}$ channels are loaded into the memory in advance and wait for display. Then, in response to receiving the user's operation for switching to a next channel (equivalent to the user's operation for switching to the $(k+1)^{th}$ page), the $(k*N+1)^{th}$ to $((k+1)*N)^{th}$ program preview images loaded instantly from the memory are scaled and then displayed in sequence in N controls for channel program preview on the $(k+1)^{th}$ page of the channel list, and the $(k+1)^{th}$ page of the channel list covers the $k^{th}$ page of the channel list. The embodiments can eliminate the time consumed by loading the program preview images from the local storage to the memory, and then the N controls for channel program preview on the $(k+1)^{th}$ page of the channel list are enabled and the channel program information is displayed after it is determined that the user actually turns pages.

In other embodiments, if the $(k+1)^{th}$ page is the last page, the program preview images of the $(k*N+1)^{th}$ to $(k+N+Q)^{th}$ channels are loaded into the memory in advance, and the $(k*N+1)^{th}$ to $(k*N+Q)^{th}$ program preview images loaded instantly from the memory are scaled and then sequentially delivered into Q control(s) for channel program preview on the $(k+1)^{th}$ page of the channel list. It is equivalent to making the Q control(s) for channel program preview on the $(k+1)^{th}$ page of the channel list take effect in advance, and is equivalent to constructing the $(k+1)^{th}$ page of the channel list in advance before the user turns the page, where the $(k+1)^{th}$ page of the channel list is just covered by the $k^{th}$ page of the channel list at this time. Then, in response to receiving the user's operation for switching to the next channel (equivalent to the user's operation for switching to the $(k+1)^{th}$ page), it is only necessary to directly control the $(k+1)^{th}$ page of the channel list to reversely cover the $k^{th}$ page of the channel list, so that the $(k+1)^{th}$ page of the channel list can be displayed on the display, thereby eliminating the time consumed by loading images from the memory and scaling the images, further improving the speed of refreshing the channel list while page switching, eliminating the image preview delay, and enhancing the user experience.

In other embodiments, if the $(k+1)^{th}$ page is not the last page, the program preview images of the $(k*N+1)^{th}$ to $((k+1)*N)^{th}$ channels are loaded into the memory in advance, and the $(k*N+1)^{th}$ to $((k+1)*N)^{th}$ program preview images loaded instantly from the memory are scaled and then sequentially delivered into N controls for channel program preview on the $(k+1)^{th}$ page of the channel list. It is equivalent to making the N controls for channel program preview on the $(k+1)^{th}$ page of the channel list take effect in advance, and is equivalent to constructing the $(k+1)^{th}$ page of the channel list in advance before the user turns the page, where the $(k+1)^{th}$ page of the channel list is just covered by the $k^{th}$ page of the channel list in this case. Then, in response to receiving the user's operation for switching to the next channel (equivalent to the user's operation for switching to the $(k+1)^{th}$ page), it is only necessary to directly control the $(k+1)^{th}$ page of the channel list to reversely cover the $k^{th}$ page of the channel list, so that the $(k+1)^{th}$ page of the channel list can be displayed on the display, thereby eliminating the time consumed by loading images from the memory and scaling the images, further improving the speed of refreshing the channel list while page switching, eliminating the image preview delay, and enhancing the user experience.

For the scheme where N or Q control(s) for channel program preview on the $(k+1)^{th}$ page of the channel list are enabled in advance before the user turns the page, after the user moves the focus onto the $N^{th}$ (last) control for channel program preview on the $k^{th}$ page, it may return to the previous page (i.e., the $(k-1)^{th}$ page), or move the focus onto the non-last control on the $k^{th}$ page again, or choose to start playing a program of a channel on the $k^{th}$ page, in this case, the user does not turn to the $(k+1)^{th}$ page. If the UI interface layer of the channel list on the $(k+1)^{th}$ page that has been constructed in advance is maintained for a long time but is not displayed, the display resources will be invalidly occupied. Based on this, in some embodiments, the timer can be started when the UI layer of the channel list on the $(k+1)^{th}$ page has been constructed. When the timing duration reaches a preset timeout period, if no operation of switching to the $(k+1)^{th}$ page is received, the constructed UI layer of the channel list on the $(k+1)^{th}$ page may be cancelled. Also, after the user's operation of switching to the $(k+1)^{th}$ page is actually received, N or Q program preview images associated with the channel list on the $(k+1)^{th}$ page can be instantly loaded from the memory, and scaled and then displayed in sequence in the corresponding controls for channel program preview.

For the scheme where the display apparatus only creates and maintains N controls for channel program preview, it is equivalent to constructing a general channel list page and synchronously refreshing the channel information and program preview images displayed by the N controls for channel program preview on this page. In this case, the effect similar to page scrolling is achieved by replacing the content displayed on the full page. For this scheme, each time the focus moves to the $N^{th}$ control for channel program preview on the page, the next group of N program preview images can be automatically loaded from the local storage into the memory in advance, thereby reducing the image preview delay while refreshing the channel list page, and improving the speed of images preview for user.

Figure 11A:
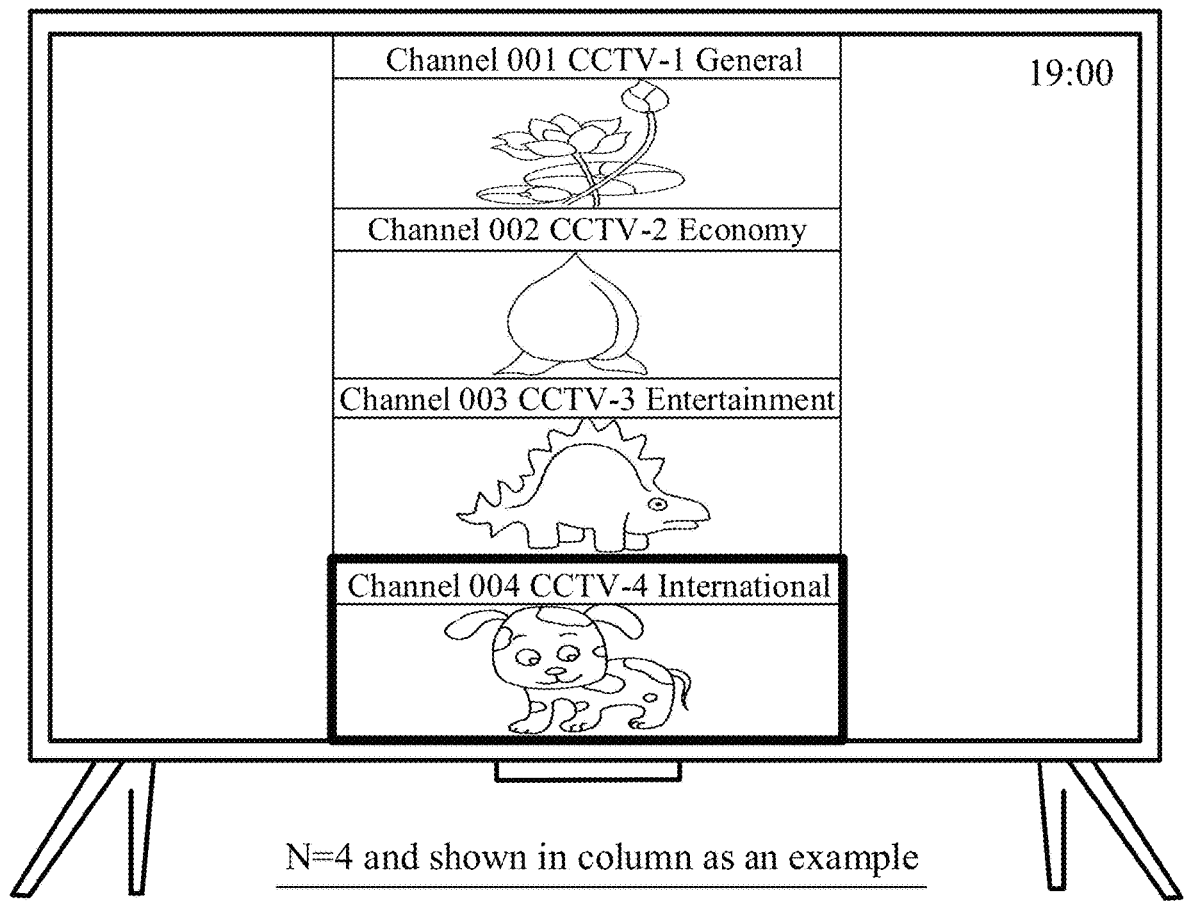
FIG. 11A shows a UI example when the user moves the focus to a program preview control for a $N^{th}$ channel on the interface as shown in FIG. 5B.
Figure 11B:
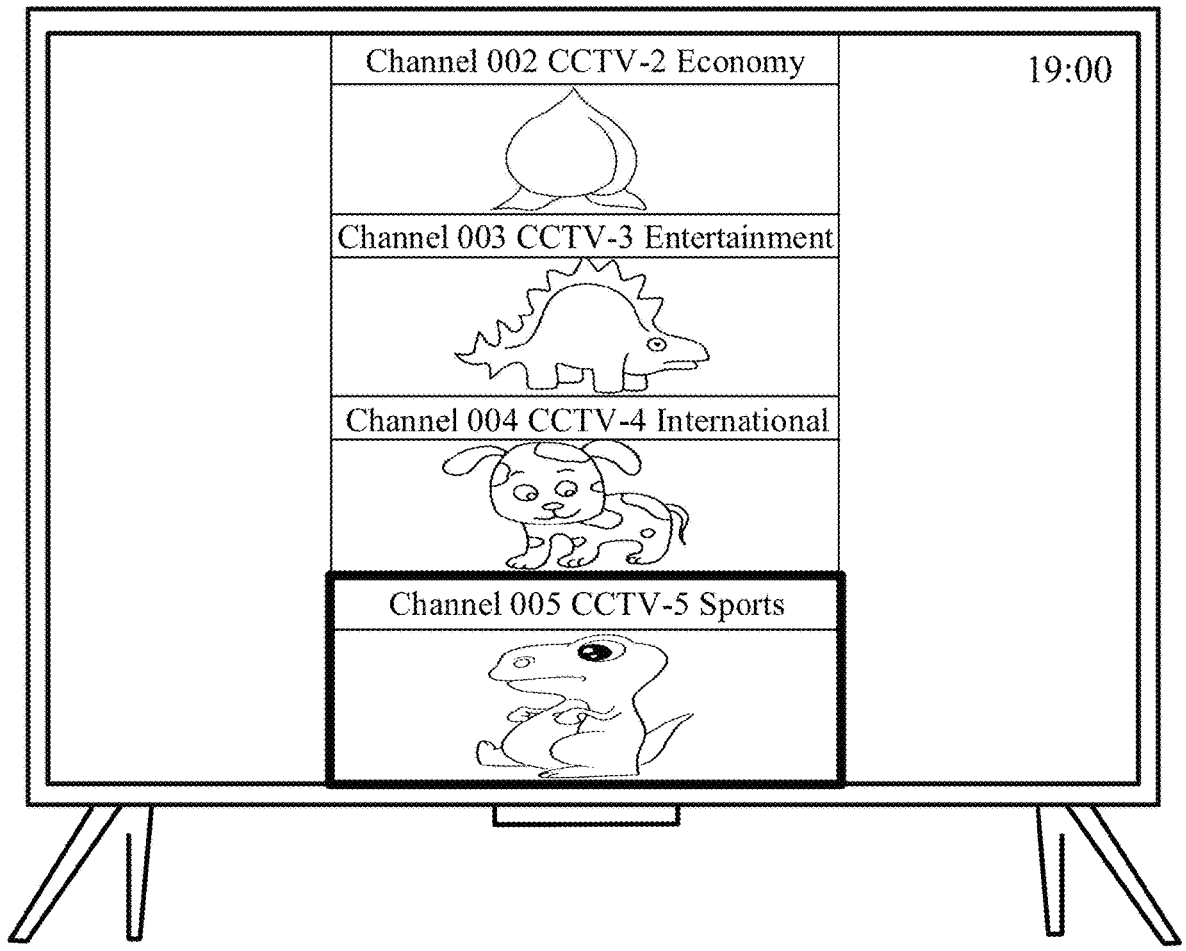
FIG. 11B shows a UI example when the user moves the focus downward on the interface as shown in FIG. 10.

The above-mentioned embodiments of displaying the channel list by page and page switching can realize quick browsing of all channels, but the display embodiments of the channel list is not limited thereto. In other embodiments, for example, the sliding mode can also be used to display the channel list. Referring to FIG. 6B, taking N=4 as an example, when the user moves the focus to the $N^{th}$ control for channel program preview, the UI changes to the example shown in FIG. 11A, and then the user continues to move the focus down by one position. As shown in FIG. 11B, the $(N+1)^{th}$ control for channel program preview gets the focus and occupies the $N^{th}$ position in the vertical direction, and in this case, the first N controls for channel program preview move up by one position, where the $1^{st}$ control for channel program preview is moved out of the interface, and the $2^{nd}$ to $N^{th}$ controls for channel program preview sequentially occupy the first (N−1) positions in sequence in the vertical direction. That is, each time the user presses the down key on the remote control, each control for channel program preview slides up by one position. While the display apparatus is displaying the interface shown in FIG. 11B, if the user presses the up key on the remote control once, each control for channel program preview slides down by one position, thereby returning to the interface shown in FIG. 11A.

Similarly, if the display in row shown in FIG. 7 is used, every time the user presses the right key of the remote control, each control for channel program preview will slide to the left by one position; every time the user presses the left key of the remote control, each control for channel program preview will slide to the right by one position. That is, compared with the display in column in FIG. 6B, the difference lies in the sliding direction.

In some embodiments, when the channel list is displayed in the sliding mode, the subsequent program preview images may also be preloaded by tracking the focus. Referring to the example in FIG. 11A, if the focus is currently moved to the $N^{th}$ control for channel program preview, the program preview images of the $(N+1)^{th}$ to $2N^{th}$ channels are preloaded from the local storage to the memory. When the user presses the down key on the remote control once, the $(N+1)^{th}$ program preview image is scaled and then loaded to be displayed in the $(N+1)^{th}$ control for channel program preview, and synchronously the channel information of the $(N+1)^{th}$ channel is displayed in the $(N+1)^{th}$ control for channel program preview, and then the $(N+1)^{th}$ control for channel program preview occupies the $N^{th}$ sequence position in the vertical direction, thereby presenting the interface effect shown in FIG. 11B.

In some embodiments, when the channel list is displayed in the sliding mode, and when it is detected that the focus is moved to the $(j*N)^{th}$ control for channel program preview, a next group of N program preview images need to be displayed, that is, the $(j*N+1)^{th}$ to $((j+1)*N)^{th}$ program preview images are preloaded into the memory, where j is an integer greater than or equal to 1. In this case, when the focus moves to the control for channel program preview with serial number being an integer multiple of N, the preloading procedure of program preview images is executed once.

In some embodiments, when the channel list is displayed in the sliding mode, only N controls for channel program preview can be created and maintained, without adding new control((s) for channel program preview along with the sliding operation. Taking sliding up and down as an example, each time the user presses the down key on the remote control, the channel numbers associated with the N controls for channel program preview are incremented by 1 in turn, and the channel information and program preview images are updated according to the updated channel numbers; every time the user presses the up key on the remote controller, the channel numbers associated with the N controls for channel program preview are decremented by 1 in turn, and the channel information and program preview images are updated according to the updated channel numbers. That is, following each sliding operation, the channel program information displayed in the N controls for channel program preview needs to be refreshed synchronously, so as to realize the dynamic update of the channel list interface.

Figure 12:
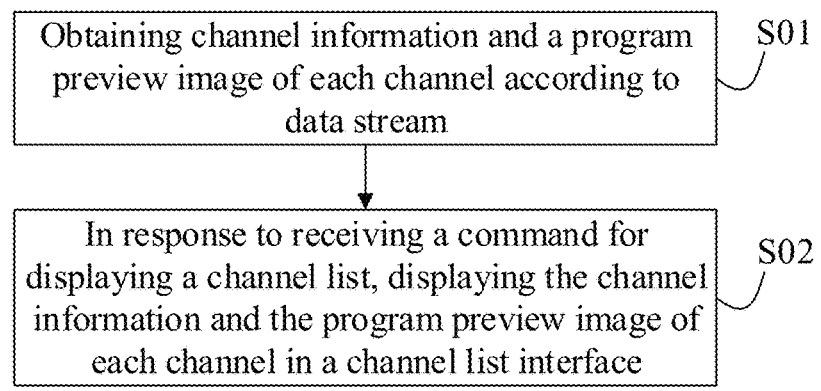
FIG. 12 shows a flowchart of a method for channel list display.

In some embodiments, as shown in FIG. 12, the disclosure provides a method for channel list display, which may be configured to be executed by the processor 250 in the display apparatus in combination with other components in the display apparatus. The method may include the following steps.

S01: obtaining channel information and a program preview image of each channel according to data stream, where the program preview image is used to show program information of a program currently played on the channel.

S02: in response to receiving a command for displaying a channel list, displaying the channel information and the program preview image of each channel in a channel list interface.

In the disclosure, the service provider can customize the program preview image of each channel and transmit the program preview image and the channel information to the display apparatus along with the data stream, and the display apparatus synchronously displays the channel information and the current program preview image of each channel in the channel list, so as to enable the user to quickly determine the channel of interest.

It should be noted that the adaptive variation, improvement and extension may be flexibly performed on the channel list display method on the basis of the embodiments illustrated in FIG. 11 in combination with various factors such as the preset layout, the display and switching mode (not limited to page-scrolling, sliding, etc.) of the channel list, the refresh mode (not limited to update of N controls for channel program preview by replacement, update of multiple controls and multiple pages by overlay, etc.) of the channel list, the image preloading mode, different user interaction scenarios and other market requirements for functions of the channel list, to obtain more diverse and feasible UI and program solutions, not limited to the embodiments provided in the specification of the disclosure. Furthermore, the UI provided in the disclosure is only schematic for the convenience of describing the embodiments, and does not represent all product design.

As mentioned above, the text description of the program from each channel is displayed on the EPG interface. However, the text form has certain limitations. The user has no way to intuitively experience the specific playing content of the program, causing poor user experience.

Some embodiments of the disclosure provide a method for displaying an Electronic Service Guide (ESG).

Figure 13:
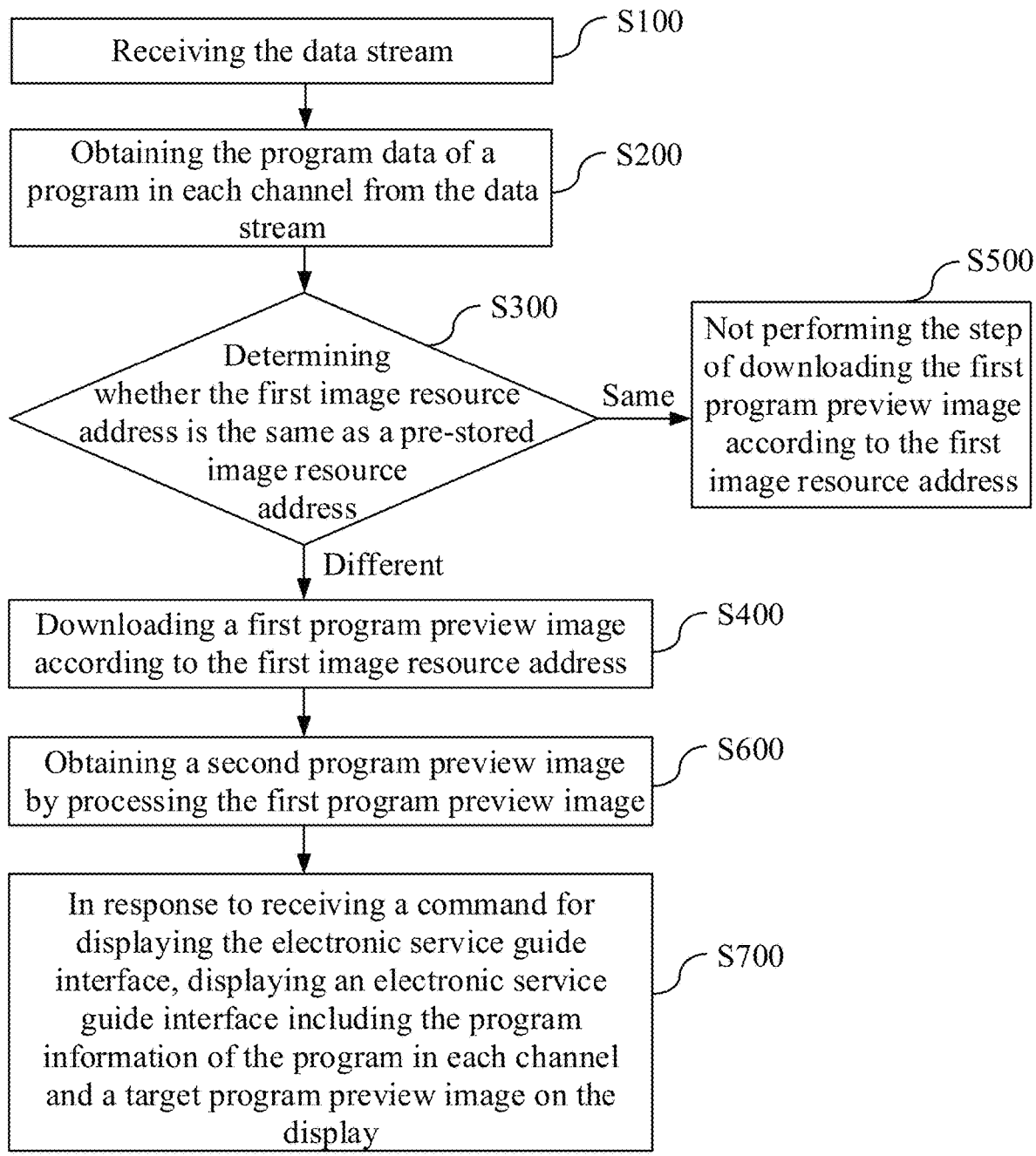
FIG. 13 shows a flowchart of a method for displaying an electronic program guide interface according to some embodiments.

FIG. 13 is a flowchart of a method for displaying an electronic program guide according to some embodiments. The embodiments of the disclosure provide a method for displaying an electronic service guide interface, including S100-S400.

S100: Receiving the data stream. In related technologies, ATSC (Advanced Television System Committee) 3.0 standard is a TV broadcast ATSC standard created by the Advanced Television System Committee, and upgrades the existing antenna TV system. In the ATSC3.0 standard, there are many novel signalings, which can be used to bring a new ESG function to the display. The broadcast system, as one of the signal sources of the display apparatus, transmits data streams to the display apparatus in the form of data streams, and the data stream may include the program data of a program from each channel.

S200: Obtaining the program data of a program in each channel from the data stream; where the program data may include program information and a corresponding first image resource address.

In some embodiments, the data stream may include the program data of programs in each channel within a preset number of days. For example, the preset number of days may be 7 days.

In some embodiments, the program information may include a program name and a channel name of a channel where the program is located. In some embodiments, the program information may further include a brief introduction of the program for briefly describing the content of the program.

In some embodiments of the disclosure, in order to allow the user to intuitively experience the specific playing content of a program from a channel, a first program preview image is set. The first program preview image may be an image for indicating highlight introduction provided by the service provider, and the setting of the first program preview image is mainly to clearly show the specific content of the program. The first program preview image can be a wonderful frame selected from the video of the program, or can be a promotional image of the program, etc., so that it can be convenient for the user to quickly obtain the program of interest.

The first image resource address can refer to the storage address of the first program preview image on the server. The display apparatus can find the first program preview image stored in the server through the storage address.

In some embodiments of the disclosure, there may be a plurality of programs in each channel, and each program may correspond to one or more first image resource addresses. The disclosure does not limit the number of first program preview images.

In some embodiments, the first program preview image may be replaced with a program clip, and the program clip is in the form of a video.

S300: Determining whether the first image resource address is the same as a pre-stored image resource address.

In some embodiments of the disclosure, the data stream will be sent to the display apparatus continuously. The display apparatus can receive the data stream, and can obtain the program data of the program(s) in each channel from the data stream.

It can be understood that some content in the program data of the program in the data stream that is continuously sent may not change, and the first image resource address of the program may not change.

In order to prevent the display apparatus from downloading the same first program preview image repeatedly according to the first image resource address in the program data when receiving the data stream each time, it is determined whether the first image resource address is the same as the pre-stored image resource address, and whether the step of downloading the first program preview image according to the first image resource address is performed according to the determining result in the embodiments of the disclosure. In this way, the problem of downloading the first program preview image repeatedly according to the first image resource address, occupying a large amount of display apparatus resources and increasing the operating load of the CPU can be avoided.

In some embodiments, the display apparatus can store pre-stored image resource addresses. In some embodiments, the display apparatus can store a first data table locally, where the first data table may include program information and corresponding pre-stored image resource addresses.

Specifically, the program data of the program from each channel is obtained from the data stream, and the data table is searched to determine whether the data table has the same program information as the program information in the program data. If the data table has no same program information as the program information in the program data, the first image resource address of the program data is used as the pre-stored image resource address, and the program information and the pre-stored image resource address are stored in the data table. If the data table has the same program information as the program information in the program data, a pre-stored image resource address corresponding to the program information is searched from the data table according to the program information in the data stream, and the step of determining whether the first image resource address in the program data is the same as the pre-stored image resource address is performed.

In some embodiments, the valid time of the pre-stored image resource address can be also stored in the first data table. After the valid time expires, the display apparatus may delete the pre-stored image resource address from the first data table, and may simultaneously delete the program information corresponding to the pre-stored image resource address.

In addition, the first program preview image downloaded to the display apparatus is stored locally in the display apparatus. The locally-stored first program preview image can be found through a first local storage address. In some embodiments, the first local storage address may be associated with the pre-stored image resource address. After the valid time expires, the display apparatus can delete the pre-stored image resource address from the first data table, and may simultaneously find the locally-stored first program preview image using the first local storage address and can delete the first program preview image.

After the program has finished playing, the program information of the program, the pre-stored image resource address and the locally-stored first program preview image will be deleted from the data table, thus reducing the occupation of storage resources of the display apparatus.

S400: If the first image resource address is different from the pre-stored image resource address, downloading a first program preview image according to the first image resource address. In some embodiments, the first program preview image can be downloaded from the server via the first image resource address, and the first program preview image can be stored locally on the display apparatus.

In some embodiments, when the first image resource address is different from the pre-stored image resource address, the pre-stored image resource address can be replaced with the first image resource address. In this case, the locally-stored first program preview image corresponding to the pre-stored image resource address can be replaced with the first program preview image downloaded this time. Of course, the program information also needs to be replaced.

S500: if the first image resource address is same as the pre-stored image resource address, not performing the step of downloading the first program preview image according to the first image resource address. In the embodiments of the disclosure, the first image resource address is the same as the pre-stored image resource address, indicating that the display apparatus has already downloaded the first program preview image from the first image resource address, so the first program preview image will not be repeatedly downloaded via the first image resource address obtained from the data stream, so as to avoid occupying too many resources of the display apparatus.

S600: After downloading the first program preview image according to the first image resource address, obtaining a second program preview image by processing the first program preview image, where the space occupied by the second program preview image is less than the space occupied by the first program preview image.

In embodiments of the disclosure, after the first program preview image is downloaded, the first program preview image will be processed, and the first program preview image is cropped and reduced, so that the space occupied by the second program preview image is less than the space occupied by the first program preview image. The second program preview image is stored locally on the display apparatus. In some embodiments, the images are scaled using the graphic processing unit (GPU).

In embodiments of the disclosure, there is no limitation on how to process the first program preview image to obtain the second program preview image, as long as it is ensured that the space occupied by the second program preview image is less than the space occupied by the first program preview image.

In some embodiments, after the valid time expires, the display apparatus can delete the pre-stored image resource address from the first data table, and also can delete the locally-stored second program preview image. The second program preview image is stored locally on the display apparatus, and the locally-stored second program preview image can be found through the second local storage address. In some embodiments, the second local storage address may be associated with the pre-stored image resource address. After the valid time expires, the display apparatus can delete the pre-stored image resource address, and may simultaneously find the locally-stored second program preview image via the second local storage address and can delete the second program preview image.

After the display apparatus has completed playing of the program, the locally-stored second program preview image can be deleted, thus reducing the occupation of storage resources of the display apparatus.

In some embodiments, when the pre-stored image resource address is different from the first image resource address, the second program preview image that is stored locally on the display apparatus and corresponds to the first program preview image at the pre-stored image resource address is replaced with the second program preview image obtained by processing the first program preview image downloaded this time.

S700: In response to receiving a command for displaying the electronic service guide interface, controlling a display to display an electronic service guide interface including the program information of the program from each channel and a target program preview image, where the target program preview image is the second program preview image.

In some embodiments, the command may be input by the user in form of voice. In an example, the user can input a voice command by saying a wake-up word and an operation to be performed by the display apparatus. For example, the user can say "Hi x, display the electronic service guide interface", where "Hi x" is the wake-up word, and "display the electronic service guide interface" is the operation which the display apparatus needs to perform. In another example, the user may input a voice command by pressing a voice input button on the control device, and speaking out the operation to be performed by the display apparatus. In yet another example, the user may press and hold a specific key on the control device, and speak out the operation to be performed by the display apparatus. In some other embodiments, the command can also be input by the user by pressing a button on the control device.

In some embodiments of the disclosure, the target program preview image is a second program preview image. The second program preview image occupies a small memory space, so that the display apparatus can quickly display the electronic service guide interface including the target program preview image, reduce the delay of image preview, increase the image preview speed, and improve the user experience.

In some embodiments of the disclosure, the electronic service guide interface presented by the display apparatus may include a target program preview image corresponding to a program from each channel. Since there may be a plurality of first program preview images corresponding to the program obtained from the data stream and then the first program preview images are processed to obtain a plurality of second program preview images, it is necessary to select one of the plurality of second program preview images as the target program preview image to be displayed on the electronic service guide interface.

In some embodiments, the second program preview images can be stored locally on the display apparatus in a certain order, and the target program preview image may be a second program preview image at a preset position among the plurality of second program preview images. For example, the target program preview image may be the first one of the plurality of second program preview images.

The program obtained from the data stream may also correspond to a first program preview image, and then the first program preview image is processed to obtain a second program preview image, so the second program preview image can be directly taken as the target program preview image to be displayed in the electronic service guide interface in this case.

Figure 14:
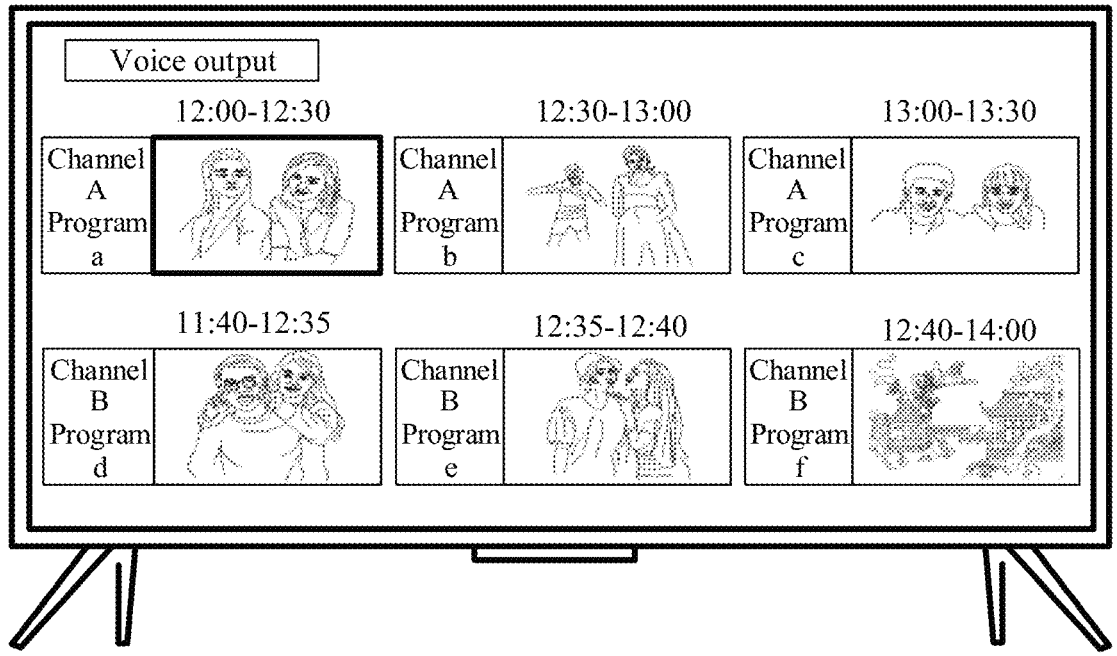
FIG. 14 shows a schematic diagram of a user interface according to some embodiments.

FIG. 14 shows a schematic diagram of a user interface according to some embodiments. In FIG. 14, the program information and target program preview images of programs in channels A and B are presented, and the program information may include program playing time, program name and channel name. There are programs a-c from channel A, the playing time of program a is 12:00-12:30, the playing time of program b is 12:30-13:00, and the playing time of program c is 13:00-13:30. In some embodiments, the program name and channel name are shown on the left side of the target program preview image, and the program playing time is displayed at the top side of the target program preview image. Exemplarily, the program name and channel name are shown on the left side of the target program preview image of program a, and the program playing time is shown at the top side of the target program preview image of program a. The program information of program a may also be displayed at other positions that facilitate the user to distinguish the program information of different programs.

Figure 15:
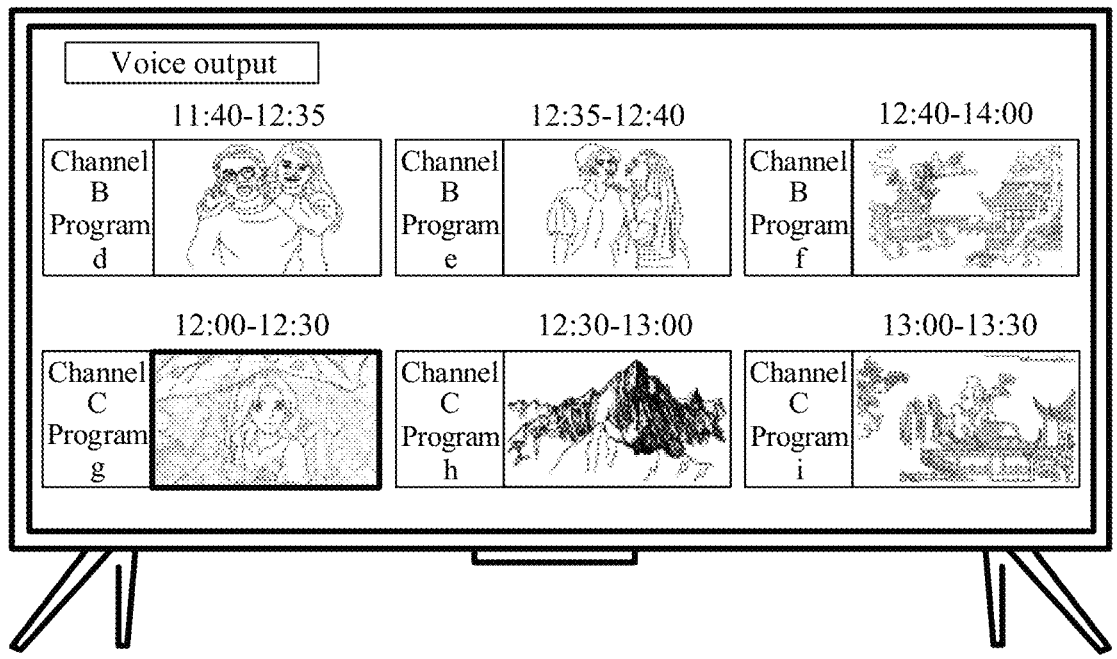
FIG. 15 shows a schematic diagram of another user interface according to some embodiments.
Figure 17:
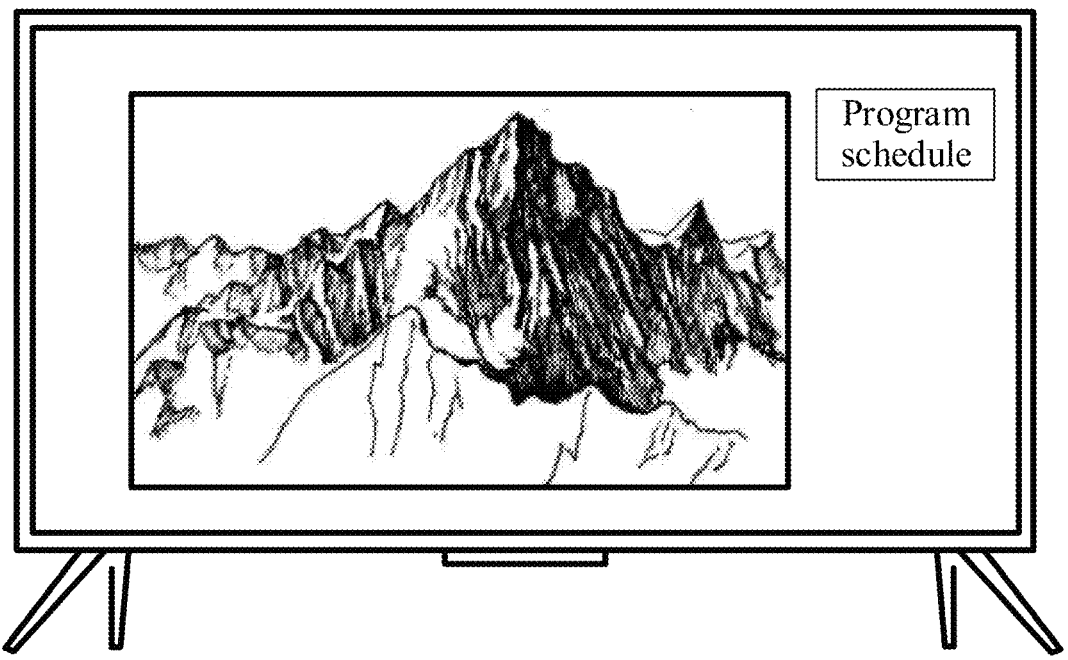
FIG. 17 shows a schematic diagram of another user interface according to some embodiments.

It should be noted that, due to the limited display area of the user interface, only the program information and target program preview images of programs from some channels can be displayed. In fact, multiple channels are not shown on the user interface. In this case, the user can press the up and down keys on the control device to show the program information and target program preview images of programs from other channels on the user interface. As shown in FIG. 14, the user moves the focus onto the target program preview image corresponding to the program from channel B via the control device, and continues to press the down key on the control device. In this case, the user interface is changed. FIG. 17 shows a schematic diagram of another user interface according to some embodiments. The user interface in FIG. 14 is changed to the user interface in FIG. 15, and the target program preview images and program information corresponding to programs from channel B and channel C are presented on interface shown in FIG. 15.

Figure 16:
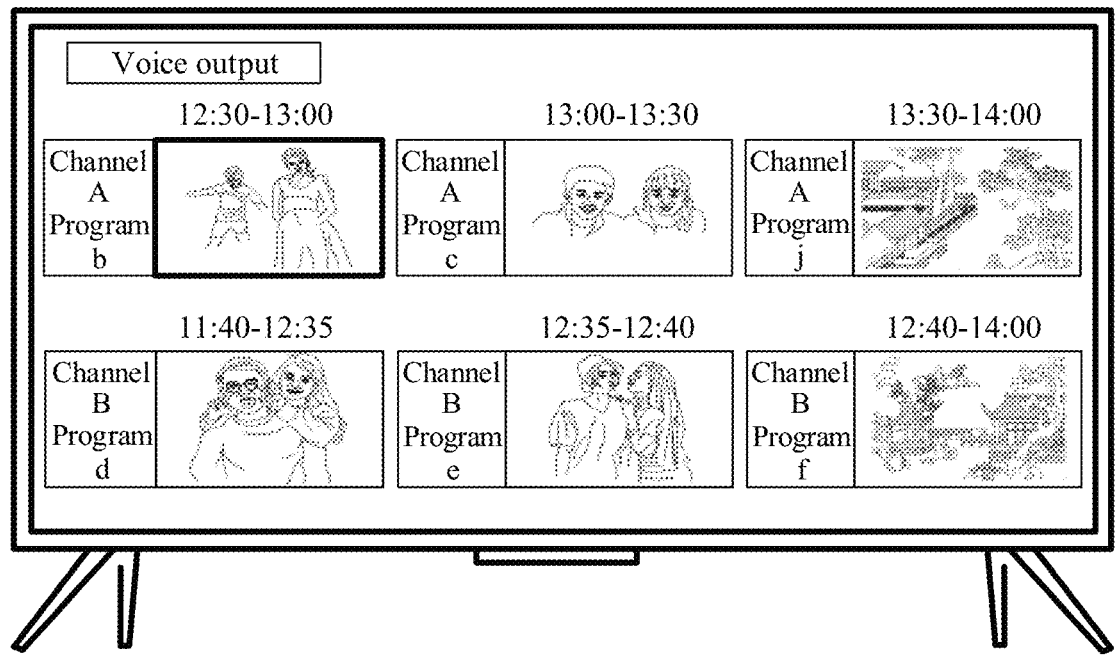
FIG. 16 shows a schematic diagram of another user interface according to some embodiments.

In addition, also due to the limited display area of the user interface, the program information and target program preview images of all programs in the channel cannot be simultaneously shown on the display either. The user can view the program information and target program preview images of other programs in the channel via the left and right keys on the control device. As shown in FIG. 14, the user moves the focus onto the target program preview image corresponding to program c via the control device, and continues to press the right key on the control device. In this case, the user interface is changed. FIG. 16 shows a schematic diagram of another user interface according to some embodiments. The user interface in FIG. 14 is changed to the user interface in FIG. 16, and the target program preview image and program information of program j from channel A are presented on the interface shown in FIG. 16. In this way, the user can fully know the programs in all channels, improving the use experience of the user.

In some embodiments, the channels shown on the ESG interface are arranged in ascending order of channel numbers.

In some embodiments, the method may further include: based on that a focus stays on the target program preview image and stay time of the focus reaches a preset time, displaying second program preview images of programs corresponding to the target program preview image sequentially in a preset order in a window for the target program preview image on the display.

In some embodiments, there are various methods for indicating that the item gets the focus. For example, the position of the item with focus can be indicated by enlarging the item, or the position of the item with focus can be indicated by setting the background color of the item visually different from other items, or the position of the item with focus can be indicated by changing the border line, size, color, transparency and outline and/or font of the text or image of the item with focus as shown in FIG. 14.

In embodiments of the disclosure, when the focus stays on a target program preview image and the stay time reaches the preset time, this indicates that the user is interested in the program corresponding to the target program preview image. In this case, the display can be controlled to play the second program preview image(s) of the program corresponding to the target program preview image in the window for the target program preview image. When the number of second program preview images is greater than 1, a plurality of second program preview images are looping in sequence. When the number of second program preview images is 1, and when the focus lands on the target program preview image, only the target program preview image is displayed.

In some embodiments, the method may further include: in response to a selection of a second program preview image displayed in the window, obtaining a first program preview image for the second program preview image, and displaying the first program preview image on the display, where a display area of the first program preview image is larger than a display area of the second program preview image.

In embodiments of the disclosure, when the focus stays on the target program preview image and the stay time reaches the preset time, the second program preview images of the program for the target program preview image will be played sequentially in the window. When the user wants to see the first program preview image corresponding to the second program preview image more clearly, the user can press the OK key on the control device while the focus lands on the second program preview image, to complete the selection of the second program preview image displayed in the window.

FIG. 17 shows a schematic diagram of another user interface according to some embodiments. The first program preview image corresponding to the second program preview image is displayed in the interface shown in FIG. 17, which is convenient for the user to know the program more clearly.

In some embodiments, the method may further include: displaying a control for program schedule while displaying the first program preview image on the display. Referring to FIG. 17, the control for program schedule is shown on the user interface of FIG. 17.

When the control for program schedule is selected, a prompt is generated according to the program corresponding to the first program preview image. In embodiments of the disclosure, the user can use the control for program schedule to schedule the program for future viewing, improving user's convenience. In some embodiments, when the focus lands on the control for program schedule, the user presses the OK key on the control device to complete the selection of the control for program schedule.

Based on that a target time arrives, the display is controlled to display the prompt to remind the user to watch the program, where the target time is a time earlier than start time of the scheduled program by preset time.

For example, the preset time may be set as 5 minutes. When the start time of the scheduled program is 12:30, the target time is 12:25.

Figure 18:
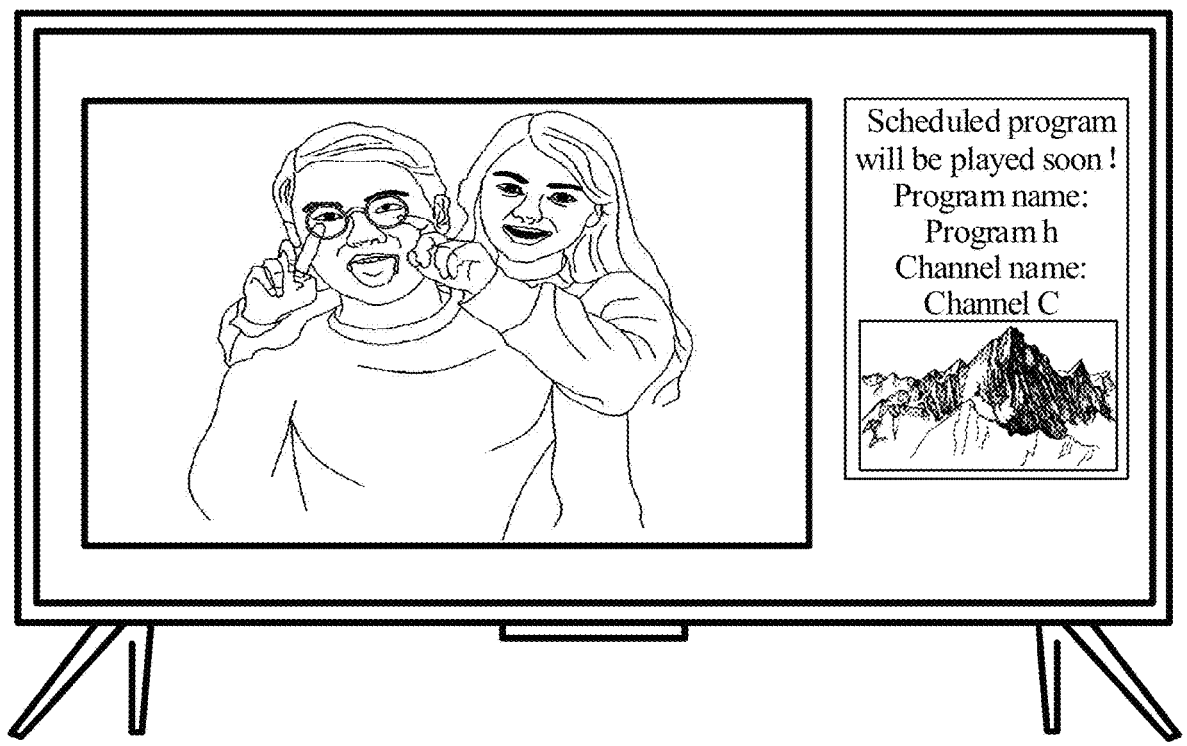
FIG. 18 shows a schematic diagram of a user interface according to some embodiments.

In some embodiments, the prompt is presented on the right side of the content being played on the display apparatus. FIG. 18 shows a schematic diagram of another user interface according to some embodiments. The user interface shown in FIG. 18 is a user interface for playing a program. When the target time arrives, the display will display a prompt on the user interface, where the prompt may include the program information of the scheduled program. In some other embodiments, the prompt may be configured on a floating layer, and the floating layer is displayed above the content being played on the display.

In some embodiments, the program data may further include an address of audio for preview content.

The audio for preview content is downloaded according to the address of audio for preview content. In embodiments of the disclosure, in order to facilitate the viewers with weak sight to understand the content displayed on the electronic service guide interface, the audio for content on the electronic service guide interface may be output via speaker when the electronic service guide interface is displayed.

In some embodiments, like the pre-stored image resource address, the address of audio for preview content may also configure with a valid time. After the valid time expires, the address of audio for preview content may be deleted.

In addition, the audio for preview content downloaded in the display apparatus can be stored locally on the display apparatus. The locally-stored audio for preview content can be found through a third local storage address. In some embodiments, the first local storage address may be associated with the third local storage address. After the valid time expires, the display apparatus can delete the locally-stored first program preview image found by using the first local storage address, and may simultaneously use the third local storage address to find the locally-stored audio for preview content, and can delete the audio for preview content. After the display apparatus has finished playing the program, the audio for preview content is deleted.

Furthermore, in some embodiments, the second local storage address and the third local storage address may be associated and stored in a second data table, and the second data table is stored locally on the display apparatus. In this way, when the second program preview image corresponding to the second local storage address is displayed, the audio for preview content can be quickly found according to the third local storage address. The audio for preview content can be quickly found, realizing the purpose of quickly playing the audio for preview content.

In some embodiments, the electronic service guide interface can be further provided with a control for voice output. Referring to FIG. 14, the control for voice output is shown in FIG. 14. The control for voice output may be in a selected state, or may be in an unselected state. In one example, when the control for voice output is in the selected state, the user can move the focus to the control for voice output and press the OK key on the control device, and in this case, the control for voice output enters the unselected state. When the control for voice output is in the unselected state, the user can move the focus to the control for voice output and press the OK key on the control device, and in this case, the control for voice output enters the selected state.

When the control for voice output is in the selected state and the focus lands on the target program preview image, the audio for preview content of the program corresponding to the target program preview image is played. In some embodiments of the disclosure, the target program preview images of programs in different channels are displayed on the electronic service guide interface. When the focus lands on the target program preview image, the audio for preview content of the program corresponding to the target program preview image is played. The audio for preview content may be used for describing the program, and may include program information and a content brief introduction of the program.

In some embodiments of the disclosure, the display apparatus may play the program content corresponding to the second program preview image in the form of voice, which is convenient for the user with weak sight to know the program preview content. In some embodiments, the obtaining the program data of the program from each channel from the data stream may include: obtaining a Service Guide Delivery Descriptor (SGDD) table and a Service Guide Delivery Unit (SGDU) table from the data stream; parsing a Service segment from the SGDD table and the SGDU table; and determining the program data of the program from each channel from the service segment. In some embodiments, the program data may include the first program information, a first image resource address, and a preview content audio address.

In some embodiments, the processor(s) may run the system of the display apparatus, and the system may include an application layer, a middleware layer and a hardware layer, as shown in FIG. 5. The middleware layer may include a docking layer and a module set that utilizes the docking layer to communicate with the application layer. The module set may include a module for obtaining broadcast signaling, a module for signaling parse, a module for determination, a module for image download, a module for image preprocessing and a module for image buffering. The module for obtaining broadcast signaling can be configured to receive the data stream from the hardware layer; and obtain a SGDD table and a SGDU table from the data stream. The module for signaling parse can be configured to parse a service segment from the SGDD table and the SGDU table; obtain the program data of a program in each channel from the service segment, where the program data may include first program information and a first image resource address; and send the first program information and the first image resource address to the module for image buffering. The module for determination can be configured to determine whether the first image resource address is the same as a pre-stored image resource address, and send a determination result to the module for image download, where the determination result is that the first image resource address is the same as or different from the pre-stored image resource address.

In some embodiments, the pre-stored image resource address corresponding to the first program information can be obtained from a data table; if the first image resource address is different from the pre-stored image resource address, the pre-stored image resource address in the data table is updated with the first image resource address.

The module for image download can be configured to download the first program preview image according to the first image resource address if the first image resource address is different from a pre-stored picture; and send the first program preview image to the module for image preprocessing.

The module for image preprocessing can be configured to process the first program preview image to obtain a second program preview image. In some embodiments, the second program preview image is stored.

The application layer can be configured to, in response to receiving an instruction for displaying an electronic service guide interface, cause the docking layer to obtain the target program preview image and program information; and cause the hardware layer to invoke the display to display the electronic service guide interface including the program information and target program preview image of the program in each channel.

In some embodiments, the module group also may include a module for audio buffering; the module for signaling parse can be further configured to send information of an address of audio for preview content to the module for audio buffering; and the module for audio buffering can be configured to download the audio for preview content according to the address of the audio for preview content. In some embodiments, the audio for preview content is stored.

The application layer can be further configured to, in response to determining that a control for playing is in the selected state and a focus lands on the target program preview image, cause the docking layer to obtain the audio for the preview content; and cause the hardware layer to invoke a speaker to play the audio for the preview content of the program corresponding to the target program preview image.

It should be noted that the above-mentioned steps in the display method of the electronic service guide interface can be adaptively adjusted in the above-mentioned modules, and the steps that can be performed by the modules are not limited to the modules described above. The use of the modules limited above is just for illustration.

The display apparatus according to some embodiments of the disclosure may include: a display configured to display a user interface; a user input interface configured to receive an input signal; and at least one processor in connection with the display and the user interface respectively and configured to execute computer instructions to cause the display apparatus to: receive data stream; obtain program data of a program in each channel from the data stream; where the program data may include program information and a corresponding first image resource address; in response to the first image resource address being different from a pre-stored image resource address, download a first program preview image according to the first image resource address; process the first program preview image to obtain a second program preview image, where a space occupied by the second program preview image is less than a space occupied by the first program preview image; and display an electronic service guide interface including the program information of the program in each channel and a target program preview image on the display in response to receiving a command for displaying the electronic service guide interface, where the target program preview image is the second program preview image.

The above-mentioned embodiments provide the display apparatus and the method for displaying the electronic service guide interface. Based on the method, the electronic service guide interface including the target program preview image of the program from each channel is displayed, so that the user can more intuitively know the specific playing content of the program played in each channel. The method may include: receiving data stream; obtaining program data of a program in each channel from the data stream; where the program data may include program information and a corresponding first image resource address; in response to the first image resource address being different from a pre-stored image resource address, downloading a first program preview image according to the first image resource address; obtaining a second program preview image by processing the first program preview image, where a space occupied by the second program preview image is less than a space occupied by the first program preview image; and controlling a display to display an electronic service guide interface including the program information of the program from each channel and a target program preview image in response to receiving a command for displaying the electronic service guide interface, where the target program preview image is the second program preview image.

For the convenience of explanation, the above description has been made in combination with specific embodiments. However, the above exemplary discussions are not intended to be exhaustive or to limit embodiments to the specific forms disclosed above. Numerous modifications and variations can be obtained in light of the above teachings. The above embodiments are chosen and described in order to better explain the principles and practical applications, so as to enable those skilled in the art to better utilize the described embodiments and various variant embodiments suitable for specific use considerations.

What is claimed is:

1. A display apparatus, comprising:
    a display configured to display an image from broadcast system or Internet, and/or, a user input interface;
    a speaker configured to play audio;
    a remote control comprising a plurality of keys;
    at least one processor in connection with the display, the speaker and the remote control and configured to execute computer instructions to cause the display apparatus to:
    obtain channel information and a program preview image of a channel according to data stream received from a broadcast system, wherein the program preview image is used to show program information currently being played on the channel, and the broadcast system comprises ATSC 3.0 system;
    in response to receiving a command for displaying a channel list, display the channel information and the program preview image of the channel in a channel list interface on the display;
    wherein obtaining channel information and the program preview image comprises:
        parsing a service segment from the data stream, wherein the service segment comprises channel information, program identifiers, and image resource addresses corresponding to the program identifiers of one or more channels; and
        downloading and storing program preview images of the one or more channels according to the image resource addresses of the one or more channels;
    wherein the at least one processor is further configured to execute computer instructions to cause the display apparatus to:
    create a correspondence list that comprises a correspondence among channel information, program identifier and image resource address of each channel; and
    in response to detecting a program switch, update the correspondence list according to data stream received from the broadcast system and the correspondence list;
    wherein updating the correspondence list comprises:
        traversing the correspondence list to find whether there is a first target channel or a second target channel in the correspondence list;
        in response to the first target channel being found, downloading and storing a new program preview image of the first target channel according to an updated image resource address of the first target channel, deleting an old program preview image of the first target channel, and updating an image resource address, a program identifier, and a program preview image in a correspondence of the first target channel;
        in response to the second target channel being found, downloading and storing a new program preview image of the second target channel according to a current image resource address of the second target channel, deleting an old program preview image of the second target channel, and updating a program identifier and a program preview image in a correspondence of the second target channel;
        in response to no first target channel and second target channel being found, keeping the program preview image of each channel unchanged.

2. The display apparatus according to claim 1, wherein the at least one processor is further configured to execute computer instructions to cause the display apparatus to:
    generate, arrange and display N controls for channel program preview in the channel list interface according to a preset layout; wherein N indicates a quantity of controls for channel program preview that the preset layout is able to accommodate;
    track a position of a focus according to the command for channel switching;
    in response to detecting that the focus lands on a $(k*N)^{th}$ control for channel program preview, load program preview images of $(k*N+1)^{th}$ to $((k+1)*N)^{th}$ channels into the memory in advance; wherein k indicates a quantity of pages of the channel list, $k \geq 1$, and each page of the channel list comprises N controls for channel program preview arranged and presented in the preset layout;
    in response to receiving a command for switching to a next channel from the user, scale $(k*N+1)^{th}$ to $((k+1)*N)^{th}$ program preview images loaded from the memory and display them in sequence in N controls for channel program preview on a $(k+1)^{th}$ page of the channel list, and control the $(k+1)^{th}$ page of the channel list to cover a $k^{th}$ page of the channel list.

3. The display apparatus according to claim 2, wherein the at least one processor is further configured to execute computer instructions to cause the display apparatus to:
    start a timer when a UI layer of the channel list on the $(k+1)^{th}$ page has been constructed;
    based on that a timing duration of the timer reaches a preset period and no operation for switching to the $(k+1)^{th}$ page is received from the user, cancel the UI layer of the channel list on the $(k+1)^{th}$ page;
    based on that the operation for switching to the $(k+1)^{th}$ page is received from the user, load N or Q program preview images associated with the channel list on the $(k+1)^{th}$ page from the memory, and scale and display the N or Q program preview images in sequence in the corresponding controls for channel program preview, wherein $1 \leq Q \leq N$.

4. The display apparatus according to claim 2, wherein the at least one processor is further configured to execute computer instructions to cause the display apparatus to:
    in response to receiving a first preset operation from the user, query a target control for preview where the focus currently lands;
    enlarge and display a target program preview image in the target control for preview;

or in response to receiving a second preset operation from the user, query a target control for preview where the focus currently lands;

close the channel list interface and display a channel program corresponding to the target control for preview.

5. The display apparatus according to claim 1, wherein the at least one processor is further configured to execute computer instructions to cause the display apparatus to:

obtain program data of a first program in a first channel; wherein the program data comprises program information and a first image resource address;

in response to the first image resource address being different from an image resource address pre-stored in the display apparatus, download a first program preview image according to the first image resource address; and obtain a second program preview image by processing the first program preview image, wherein a space occupied by the second program preview image is less than a space occupied by the first program preview image;

in response to receiving a command for displaying the electronic service guide interface, display an electronic service guide interface comprising the program information of the program in the first channel and a target program preview image, wherein the target program preview image comprises the second program preview image.

6. The display apparatus according to claim 5, wherein the at least one processor is further configured to execute computer instructions to cause the display apparatus to:

based on that a focus stays on the target program preview image and a stay time of the focus reaches a preset time, display second program preview image of the program corresponding to the target program preview image in a window for the target program preview image on the display;

in response to a selection of a second program preview image displayed in the window, obtain the first program preview image corresponding to the second program preview image, and display the first program preview image on the display, wherein a display area of the first program preview image is larger than a display area of the second program preview image.

7. The display apparatus according to claim 6, wherein the at least one processor is further configured to execute computer instructions to cause the display apparatus to:

display a control for program schedule while displaying the first program preview image on the display;

in response to a selection of the control for program schedule, generate a prompt for a scheduled program corresponding to the first program preview image;

based on that a target time for the scheduled program arrives, display the prompt on the display to remind the user to watch the program, wherein the target time is earlier than a start time of the scheduled program by a preset time.

8. A method for a display apparatus, comprising:

obtaining channel information and a program preview image of a channel according to data stream received from a broadcast system, wherein the program preview image is used to show program information currently being played on the channel, and the broadcast system comprises ATSC 3.0 system;

in response to receiving a command for displaying a channel list, displaying the channel information and the program preview image of the channel in a channel list interface on a display of the display apparatus;

wherein the display apparatus comprises the display, a user input interface; a speaker configured to play audio; and a remote control comprising a plurality of keys;

wherein obtaining channel information and the program preview image comprises:

parsing a service segment from the data stream, wherein the service segment comprises channel information, program identifiers, and image resource addresses corresponding to the program identifiers of one or more channels; and downloading and storing program preview images of the one or more channels according to the image resource addresses of the one or more channels;

wherein the method further comprises:

creating a correspondence list that comprises a correspondence among channel information, program identifier and image resource address of each channel; and in response to detecting a program switch, updating the correspondence list according to data stream received from the broadcast system and the correspondence list;

wherein updating the correspondence list comprises:

traversing the correspondence list to find whether there is a first target channel or a second target channel in the correspondence list;

in response to the first target channel being found, downloading and storing a new program preview image of the first target channel according to an updated image resource address of the first target channel, deleting an old program preview image of the first target channel, and updating an image resource address, a program identifier, and a program preview image in a correspondence of the first target channel;

in response to the second target channel being found, downloading and storing a new program preview image of the second target channel according to a current image resource address of the second target channel, deleting an old program preview image of the second target channel, and updating a program identifier and a program preview image in a correspondence of the second target channel;

in response to no first target channel and second target channel being found, keeping the program preview image of each channel unchanged.

9. The method according to claim 8, further comprising:

generating, arranging and displaying N controls for channel program preview in the channel list interface according to a preset layout; wherein N indicates a quantity of controls for channel program preview that the preset layout is able to accommodate;

tracking a position of a focus according to the command for channel switching;

in response to detecting that the focus lands on a $(k*N)^{th}$ control for channel program preview, loading program preview images of $(k*N+1)^{th}$ to $((k+1)*N)^{th}$ channels into the memory in advance; wherein k indicates a quantity of pages of the channel list, $k \geq 1$, and each page of the channel list comprises N controls for channel program preview arranged and presented in the preset layout;

in response to receiving a command for switching to a next channel from the user, scaling $(k*N+1)^{th}$ to $((k+1)*N)^{th}$ program preview images loaded from the memory and displaying them in sequence in N controls for channel program preview on a $(k+1)^{th}$ page of the channel list, and controlling the $(k+1)^{th}$ page of the channel list to cover a $k^{th}$ page of the channel list.

10. The method according to claim 9, further comprising:
starting a timer when a UI layer of the channel list on the $(k+1)^{th}$ page has been constructed;
in response to a timing duration of the timer reaches a preset timeout period, based on that no operation for switching to the $(k+1)^{th}$ page is received from the user, cancelling the UI layer of the channel list on the $(k+1)^{th}$ page;
based on that the operation for switching to the $(k+1)^{th}$ page is received from the user, loading N or Q program preview images associated with the channel list on the $(k+1)^{th}$ page from the memory, and scaling and displaying the N or Q program preview images in sequence in the corresponding controls for channel program preview, wherein $1 \leq Q \leq N$.

11. The method according to claim 9, further comprising:
in response to receiving a first preset operation from the user, querying a target control for preview where the focus currently lands;
enlarging and displaying a target program preview image in the target control for preview;
or
in response to receiving a second preset operation from the user, querying a target control for preview where the focus currently lands;
closing the channel list interface and display a channel program corresponding to the target control for preview.

12. The method according to claim 8, further comprising:
obtaining program data of a first program in a first channel; wherein the program data comprises program information and a first image resource address;
in response to the first image resource address being different from an image resource address pre-stored in the display apparatus, downloading a first program preview image according to the first image resource address; and obtaining a second program preview image by processing the first program preview image, wherein a space occupied by the second program preview image is less than a space occupied by the first program preview image;
in response to receiving a command for displaying the electronic service guide interface, displaying an electronic service guide interface comprising the program information of the program in the first channel and a target program preview image, wherein the target program preview image comprises the second program preview image.

13. The method according to claim 12, further comprising:
based on that a focus stays on the target program preview image and a stay time of the focus reaches a preset time, displaying second program preview image of the program corresponding to the target program preview image in a window for the target program preview image on the display;
in response to a selection of a second program preview image displayed in the window, obtaining the first program preview image corresponding to the second program preview image, and displaying the first program preview image on the display, wherein a display area of the first program preview image is larger than a display area of the second program preview image.

14. The method according to claim 13, further comprising:
displaying a control for program schedule while displaying the first program preview image on the display;
in response to a selection of the control for program schedule, generating a prompt for a scheduled program corresponding to the first program preview image;
based on that a target time for the scheduled program arrives, displaying the prompt on the display to remind the user to watch the program, wherein the target time is earlier than a start time of the scheduled program by a preset time.

* * * * *